United States Patent
Wada

(10) Patent No.: US 7,515,180 B2
(45) Date of Patent: Apr. 7, 2009

(54) SHOOTING APPARATUS AND SERVERS, SYSTEMS AND METHODS FOR MANAGING IMAGES SHOT BY THE SHOOTING APPARATUS

(75) Inventor: Toshiaki Wada, Tama (JP)

(73) Assignee: Olympus Corporation, Tokyo (JP)

( * ) Notice: Subject to any disclaimer, the term of this patent is extended or adjusted under 35 U.S.C. 154(b) by 667 days.

(21) Appl. No.: 11/075,572

(22) Filed: Mar. 9, 2005

(65) Prior Publication Data
US 2005/0226413 A1    Oct. 13, 2005

(30) Foreign Application Priority Data
Mar. 12, 2004  (JP)  ............... 2004-071588
Jan. 12, 2005  (JP)  ............... 2005-005448

(51) Int. Cl.
H04N 5/232  (2006.01)
H04N 5/76   (2006.01)

(52) U.S. Cl. ............. 348/231.2; 348/207.1; 348/211.99
(58) Field of Classification Search ............. 348/207.1, 348/211.99–211.3, 231.99, 231.2, 231.3, 348/231.6; 380/277–279, 286
See application file for complete search history.

(56) References Cited

U.S. PATENT DOCUMENTS

| | | | |
|---|---|---|---|
| 5,499,294 A * | 3/1996 | Friedman | ............... 713/179 |
| 6,636,259 B1 * | 10/2003 | Anderson et al. | ......... 348/211.3 |
| 6,968,058 B1 * | 11/2005 | Kondoh et al. | ............. 380/200 |
| 2003/0048358 A1 * | 3/2003 | Shirai | ..................... 348/207.1 |
| 2004/0066456 A1 * | 4/2004 | Read | ..................... 348/207.1 |
| 2004/0125208 A1 * | 7/2004 | Malone et al. | ......... 348/207.1 |
| 2004/0201678 A1 * | 10/2004 | Armstrong | ............. 348/207.1 |
| 2005/0193421 A1 * | 9/2005 | Cragun | ..................... 725/80 |

FOREIGN PATENT DOCUMENTS

| JP | 2000-333266 | 11/2000 |
|---|---|---|
| JP | 2000-354188 | 12/2000 |

* cited by examiner

Primary Examiner—Timothy J Henn
(74) Attorney, Agent, or Firm—Straub & Pokotylo; John C. Pokotylo

(57) ABSTRACT

There is disclosed a shooting apparatus includes a shooting portion which shoots a subject to generate an original image, an index image generating portion which generates an index image from the original image, an image memory which stores at least an image, a communicating portion which performs transmission/reception of information with a managing server which manages images by radio, a transmitting portion which transmits the original image shot by the shooting portion to the managing server through the communicating portion, and an original image specifying information storage portion which stores in the image memory the index image of the original image and original image specifying information which specifies the original image in the managing server in association with each other.

13 Claims, 23 Drawing Sheets

SHOOTING APPARATUS AND SERVERS, SYSTEMS AND METHODS FOR MANAGING IMAGES SHOT BY THE SHOOTING APPARATUS

CROSS-REFERENCE TO RELATED APPLICATIONS

This application is based upon and claims the benefit of priority from prior Japanese Patent Applications No. 2004-071588, filed Mar. 12, 2004; and No. 2005-005448, Jan. 12, 2005, the entire contents of both of which are incorporated herein by reference.

BACKGROUND OF THE INVENTION

1. Field of the Invention

The present invention relates to a technique which provides a user with a shot image under certain conditions while restricting shooting in a place like concert hall where shooting is restricted.

2. Description of the Related Art

In concert halls or event sites, it is often the case that photo shooting is inhibited in principle and carrying cameras into such sites is also prohibited. However, many audiences have a grievance against this measure by a promoter, and there are cases where audiences do not follow the photo shooting inhibition rule.

Thus, there have been disclosed a technique which assuredly inhibits photo shooting by sending a signal which restricts utilization of cameras of audiences (Jpn. Pat. Appln. KOKAI Publication No. 2000-333266) and a technique by which save of captured images is restricted by a camera server (Jpn. Pat. Appln. KOKAI Publication No. 2000-354188).

BRIEF SUMMARY OF THE INVENTION

There is provided a shooting apparatus according to a first aspect of the present invention, the shooting apparatus comprising: a shooting portion which shoots a subject to generate an original image; an index image generating portion which generates an index image from the original image; an image memory which stores at least an image; a communicating portion which performs transmission/reception of information with a managing server which manages images by radio; a transmitting portion which transmits the original image shot by the shooting portion to the managing server through the communicating portion; and an original image specifying information storage portion which stores in the image memory the index image of the original image and original image specifying information which specifies the original image in the managing server in association with each other.

There is provided a shooting apparatus according to a second aspect of the present invention, the shooting apparatus comprising: a shooting portion which shoots a subject to generate an original image; an index image generating portion which generates an index image from the original image; an image memory which stores at least an image; a communicating portion which performs transmission/reception of information with a managing server which manages images by radio; an original image specifying information generation portion which generates original image specifying information which specifies the original image; an encryption key request transmitting portion which transmits an encryption key request including the original image specifying information to the managing server through the communicating portion; an encryption key receiving portion which receives an encryption key from the managing server through the communicating portion; an encryption portion which encrypts the original image by using the received encryption key; and an encrypted image storage portion which stores the original image specifying information, the encrypted original image and the index image of the original image in the image memory in association with each other.

There is provided a shooting apparatus according to a third aspect of the present invention, the shooting apparatus operating under management by a managing server which manages shooting, the shooting apparatus comprising: a shooting portion which shoots a subject to generate an original image; an index image generating portion which generates an index image from the original image shot by the shooting portion; an image memory which stores at least an image; a shooting management signal receiving portion which receives a shooting management signal which manages shooting from the managing server; and an image storage control portion which determines a mode of storing the original image in the image memory based on shooting admission level information included in the shooting management signal.

There is provided a shooting apparatus according to a fourth aspect of the present invention, the shooting apparatus operating under management of a managing server which manages shooting, the shooting apparatus comprising: a shooting portion which shoots a subject to generate an original image; an index image generating portion which generates an index image from the original image; an image memory which stores at least an image; a communicating portion which performs transmission/reception of information with the managing server by radio; an original image specifying information generation portion which generates original image specifying information which specifies the original image; a shooting management signal receiving portion which receives a shooting management signal which manages shooting from the managing server; an encryption key request transmitting portion which transmits an encryption key request including the original image specifying information to the managing server through the communicating portion; an encryption key receiving portion which receives an encryption key from the managing server through the communicating portion; an encryption portion which encrypts the original image by using the received encryption key; an encrypted image storage portion which stores the original image specifying information, the encrypted original image and an index image of the original image in the image memory in association with each other; and an image storage control portion which determines either storing the original image encrypted by the encryption portion in the image memory by using the encrypted image storage portion or storing the original image in the image memory as it is depending on a shooting admission level information included in the shooting management signal.

There is provided a managing server according to the first aspect of the present invention, the managing server managing images shot by shooting apparatuses, the managing server comprising: an information communicating portion which performs transmission/reception of information with each shooting apparatus; an image receiving portion which receives an image from the shooting apparatus through the information communicating portion; a specific information generation portion which generates image specifying information which specifies the received image; an information memory which stores the image received by the image receiving portion and the image specifying information which is generated by the specific information generation portion and specifies the image in association with each other; and a specific information transmitting portion which transmits the image specifying information which is generated by the specific information generating portion and specifies the image to the shooting apparatus through the information communicating portion.

There is provided a managing server according to the second aspect of the present invention, the managing server managing images shot by shooting apparatuses, the managing server having: a shooting admission level setting portion which sets a level of restricting a shooting operation of the shooting apparatuses; a shooting management signal generation portion which generates a shooting management signal including a shooting admission level set by the shooting admission level setting portion as shooting admission level information; a shooting management signal transmitting portion which transmits the shooting management signal to the shooting apparatus; an information communicating portion which performs transmission/reception of information with each shooting apparatus; an image receiving portion which receives an image transmitted by the shooting apparatus through the information communicating portion; a specific information generation portion which generates image specifying information which specifies the received image; an information memory which stores the image received by the image receiving portion and the image specifying information which is generated by the specific information generating portion and specifies the image in association with each other; and a specification information transmitting portion which transmits the image specifying information which is generated by the specific information generating portion and specifies the image to the shooting apparatus through the information communicating portion.

There is provided a managing server according to the third aspect of the present invention, the managing server managing images shot by shooting apparatuses, the managing server having: an information communicating portion which performs transmission/reception of information with each shooting apparatus; an information memory which stores the information received through the information communicating portion; an encryption key request receiving portion which receives an encryption key request including image specifying information which specifies an image in the shooting apparatus from the shooting apparatus through the information communicating portion; an encryption key generation portion which generates an encryption key and a decryption key in accordance with the encryption key request; an encryption key transmitting portion which transmits the encryption key generated by the encryption key generation portion to the shooting apparatus through the communicating portion; a decryption key storage portion which stores the image specifying information included in the encryption key request and the decryption key generated by the encryption key generation portion in the information memory in association with each other; a decryption key request receiving portion which receives a decryption key request including the image specifying information from the shooting apparatus through the communicating portion; a decryption key read portion which reads the decryption key from the information memory in accordance with the image specifying information included in the decryption key request; and a decryption key transmitting portion which transmits the decryption key read by the decryption key read portion to the shooting apparatus through the communicating portion.

There is provided a shooting managing system according to the first aspect of the present invention, the shooting managing system comprising: shooting apparatuses; and a managing server which manages images shot by the shooting apparatuses, each shooting apparatus having: a shooting portion which shoots a subject to generate an image; an index image generating portion which generates an index image from the image; an image memory which stores at least the index image generated by the index image generating portion; a first communicating portion which performs transmission/reception of information with the managing server by radio; a transmitting portion which transmits the image shot by the shooting portion to the managing server through the first communicating portion; a receiving portion which receives image specifying information which specifies the image in the managing server through the first communicating portion; and an image specifying information storage portion which stores the received image specifying information and the index image of the image in the image memory in association with each other, the managing server having: a second communicating portion which performs transmission/reception of information with each shooting apparatus; an image receiving portion which receives the image transmitted by the shooting apparatus through the second communicating portion; a specific information generating portion which generates the image specifying information which specifies the received image; an information memory which stores the image received by the image receiving portion and the image specifying information which specifies the image generated by the specific information generating portion in association with each other; and a specification information transmitting portion which transmits the image specifying information which is generated by the specific information generating portion and specifies the image to the shooting apparatus through the second communicating portion.

There is provided a shooting managing system according to the second aspect of the present invention, the shooting managing system comprising: shooting apparatuses; and a managing server which manages images shot by the shooting apparatuses, each shooting apparatus having: a shooting portion which shoots a subject to generate an image; an index image generating portion which generates an index image from the image; an image memory which stores images; an image specifying information generation portion which generates image specifying information which specifies the image shot by the shooting portion; a first communicating portion which performs transmission/reception of information with the managing server by radio; an encryption key request transmitting portion which transmits an encryption key request including the image specifying information to the managing server through the first communicating portion; an encryption key receiving portion which receives an encryption key requested through the first communicating portion from the managing server; an encryption portion which encrypts the image by using the received encryption key; and an encrypted image storage portion which stores the encrypted image in the image memory in association with the image specifying information, the managing server having: a second communicating portion which performs transmission/reception of information with the shooting apparatus; an information memory which stores the information received through the second communicating portion; an encryption key generation portion which generates an encryption key and a decryption key; an encryption key request receiving portion which receives the encryption key request through the second communicating portion; an encryption key generation portion which generates an encryption key and a decryption key in accordance with the encryption key request; an encryption key transmitting portion which transmits the generated encryption key to the shooting apparatus through the second communicating portion; and a decryption key storage portion which stores the image specifying information included in the encryption key request and the decryption key generated by the encryption key generation portion in the information memory in association with each other.

There is provided a shooting managing method according to the first aspect of the present invention, the shooting managing method being an image managing method in a system comprising shooting apparatuses and a managing server, each shooting apparatus having: a shooting portion which shoots a subject to generate an image; an image memory which stores at least the image; and a first information communicating portion which performs transmission/reception of information by radio, the managing server having: a second information communicating portion which performs transmission/reception of information with each shooting apparatus by radio; and an information memory which stores information, wherein the shooting apparatus performs: shooting a subject by using the shooting portion; generating an index image of the shot image from the shot image; and transmitting the shot image to the managing server through the first information communicating portion, the managing server performs: receiving the image transmitted by the shooting apparatus through the second information communicating portion; generating image specifying information which specifies the image received through the second information communicating portion; storing the received image and the generated image specifying information which specifies the image in the information memory in association with each other; and transmitting the generated image specifying information to the shooting apparatus through the second information communicating portion, and the shooting apparatus performs: receiving the image specifying information transmitted by the managing server through the first information communicating portion; and storing the received image specifying information and the index image of the image shot by the shooting portion in the image memory in association with each other.

There is provided a shooting managing method according to the second aspect of the present invention, the shooting managing method being an image managing method in a system comprising shooting apparatuses and a managing server, each shooting apparatus having: a shooting portion which shoots a subject to generate an image; an image memory which stores at least the image; and a first information communicating portion which performs transmission/reception of information by radio, the managing server having: a second information communicating portion which performs transmission/reception of information with each shooting apparatus by radio; and an information memory which stores information, wherein the shooting apparatus performs: shooting a subject by using the shooting portion; generating an index image of the shot image and image specifying information which specifies the image; and transmitting the generated image specifying information to the managing server through the first information communicating portion, the managing server performs: receiving the image specifying information from the shooting apparatus through the second information communicating portion; generating an encryption key and decryption key; storing the generated decryption key and the received image specifying information in the information memory in association with each other; transmitting the encryption key to the shooting apparatus through the second communicating portion, and the shooting apparatus performs: receiving the encryption key from the managing server through the first communicating portion; encrypting the image by using the received encryption key; and storing the encrypted image and the image specifying information in the image memory in association with each other.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
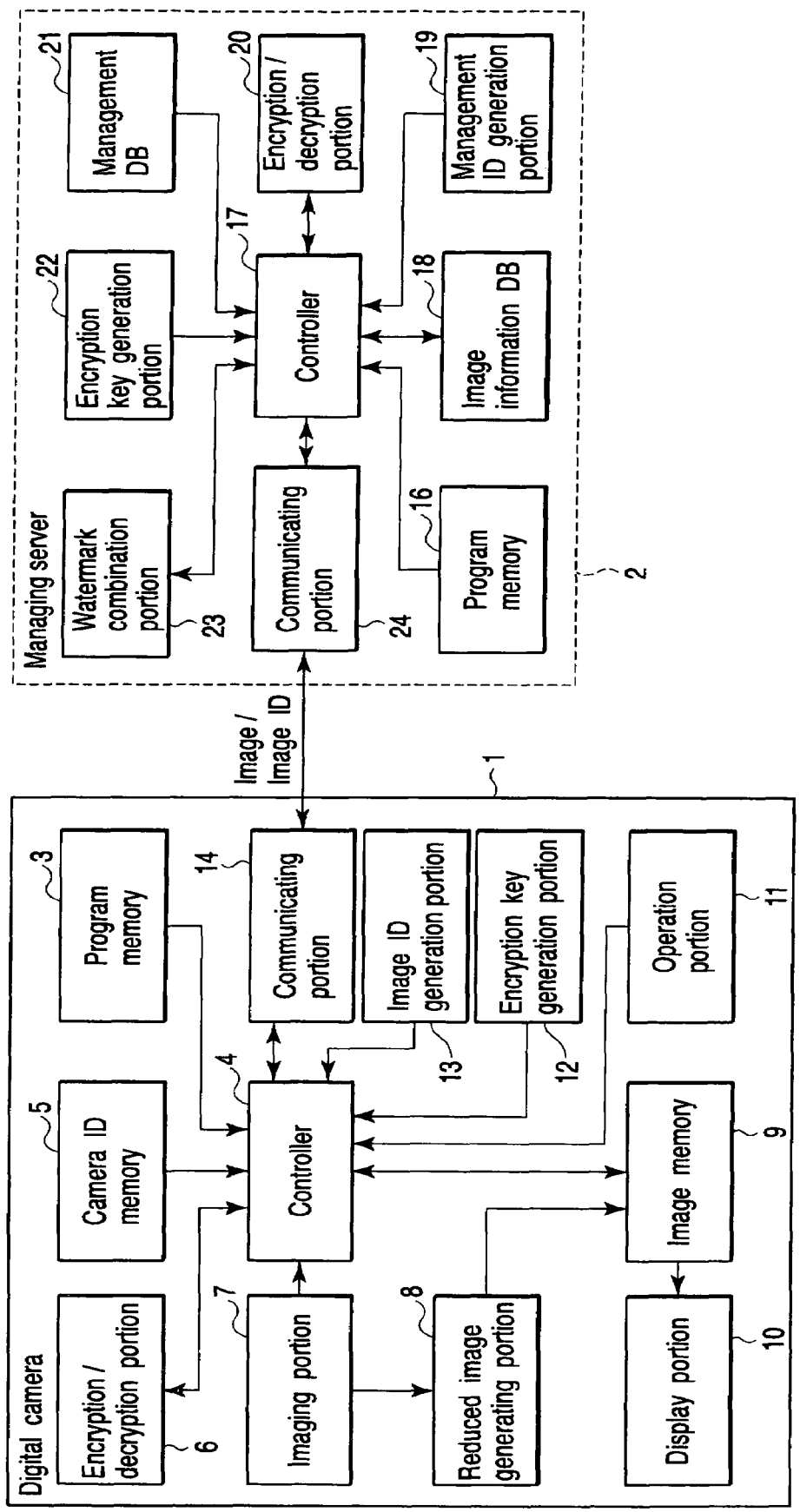
FIG. 1 is a block diagram showing a configuration of a shooting managing system according to a first embodiment.

FIG. 1 is a block diagram showing a configuration of a shooting managing system according to a first embodiment of the present invention;

As shown in FIG. 1, this system has a digital camera 1 and a managing server 2 as a server which manages information. In this example, the digital camera 1 is possessed by or lent to a person who is a target of a shooting restriction. The managing server 2 is installed in, e.g., a place where shooting must be restricted. For example, when this system is applied to a concert hall where shooting must be restricted, the digital camera 1 is possessed by a visitor, and the managing server 2 is installed in the concert hall or the like.

The digital camera 1 has a program memory 3, a controller 4, a camera ID memory 5, an encryption/decryption portion 6, an imaging portion 7, a reduced image generating portion 8, an image memory 9, a display portion 10, an operation portion 11, an encryption key generation portion 12, an image ID generation portion 13 and a communicating portion 14.

The program memory 3 stores a control program which controls operations of the entire digital camera 1 and a shooting managing program. The controller 4 controls operations of the entire digital camera 1 by reading and executing the control program. The camera ID memory 5 stores a camera ID which specifies the digital camera 1 or a user. The encryption/decryption portion 6 performs encryption of information and decryption of encrypted information. The imaging portion 7 is means for shooting an image, and obtains original image data by imaging a subject. The reduced image generating portion 8 generates reduced image data (which will be referred to as thumbnail image data hereinafter) concerning a reduced image for an index (which will be referred to as a thumbnail image hereinafter) from obtained original image data. The image memory 9 stores image data or the like. The display portion 10 displays an original image obtained by the imaging portion 7 or a thumbnail image or the like stored in the image memory 9. The operation portion 11 has a function which selects an image displayed in the display portion 10, accepts various kinds of inputs, instructions or the like from a user and notifies the controller 4 of this acceptance. The encryption key generation portion 12 generates an encryption key and a decryption key. The image ID generation portion 13 generates an image ID which specifies original image data. The communicating portion 14 performs transmission/reception of information by radio.

The managing server 2 has a program memory 16, a controller 17, an image information database (DB) 18, a management ID generation portion 19, an encryption/decryption portion 20, a management database (DB) 21, an encryption key generation portion 22, a watermark combination portion 23 and a communicating portion 24.

The program memory 16 stores a control program which is used to control operations of the entire managing server 2 and a shooting management program. The controller 17 controls operations of the entire managing server 2 by reading and executing the control program. The image information DB 18 stores an original image, original image data and an image ID. The management ID generation portion 19 generates a camera ID as a management ID. The encryption/decryption portion 20 performs encryption of information and decryption of encrypted information. The management DB 21 stores information concerning management of the digital camera based on a generated camera ID. The encryption key generation portion 22 generates an encryption key and a decryption key. The watermark combination portion 23 generates watermark data (a digital watermark) for the purpose of protecting a copyright and combines the watermark data with original image data. The communicating portion 24 performs transmission/reception of information by radio.

Figure 2:
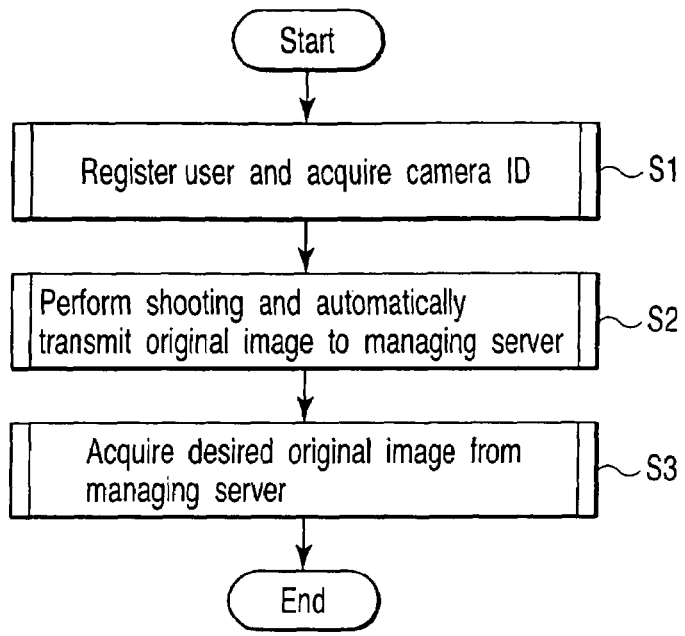
FIG. 2 is a general flowchart showing an operation of the shooting managing system according to the first embodiment.
Figure 3:
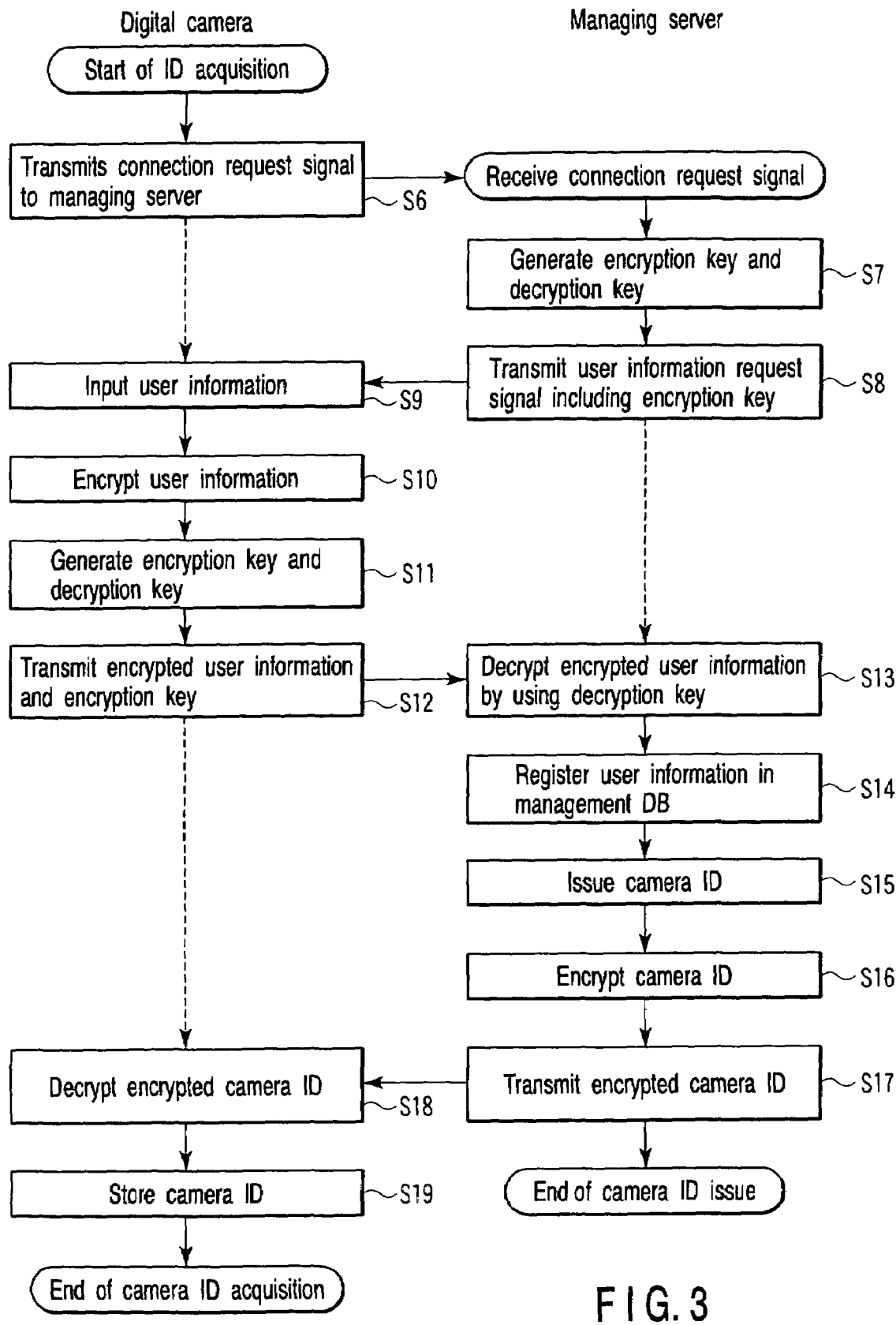
FIG. 3 is a flowchart showing a processing content of registering a user and acquiring a camera ID.
Figure 4:
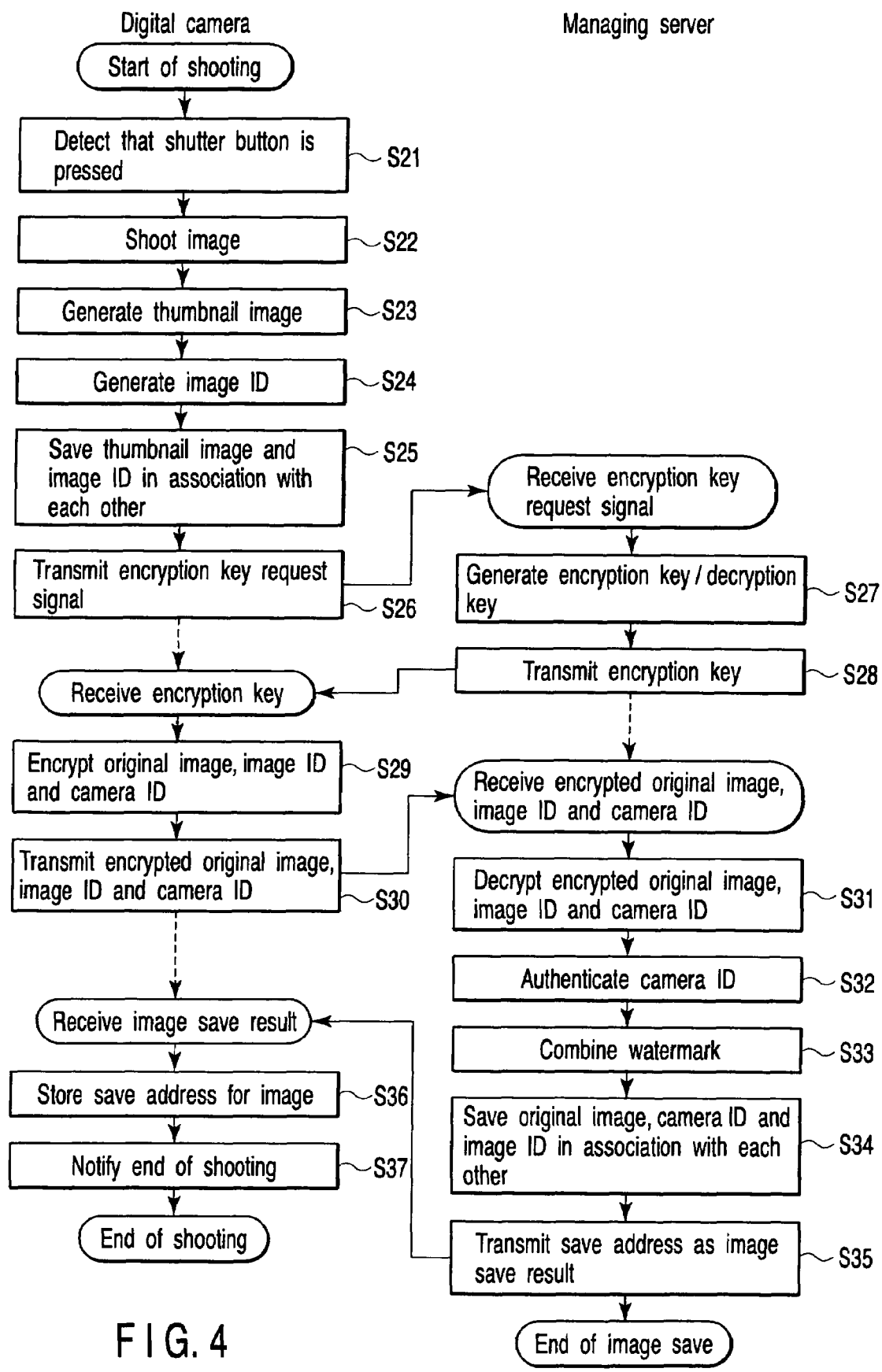
FIG. 4 is a flowchart showing a processing content of performing shooting and transmitting an original image to a managing server 2.
Figure 5:
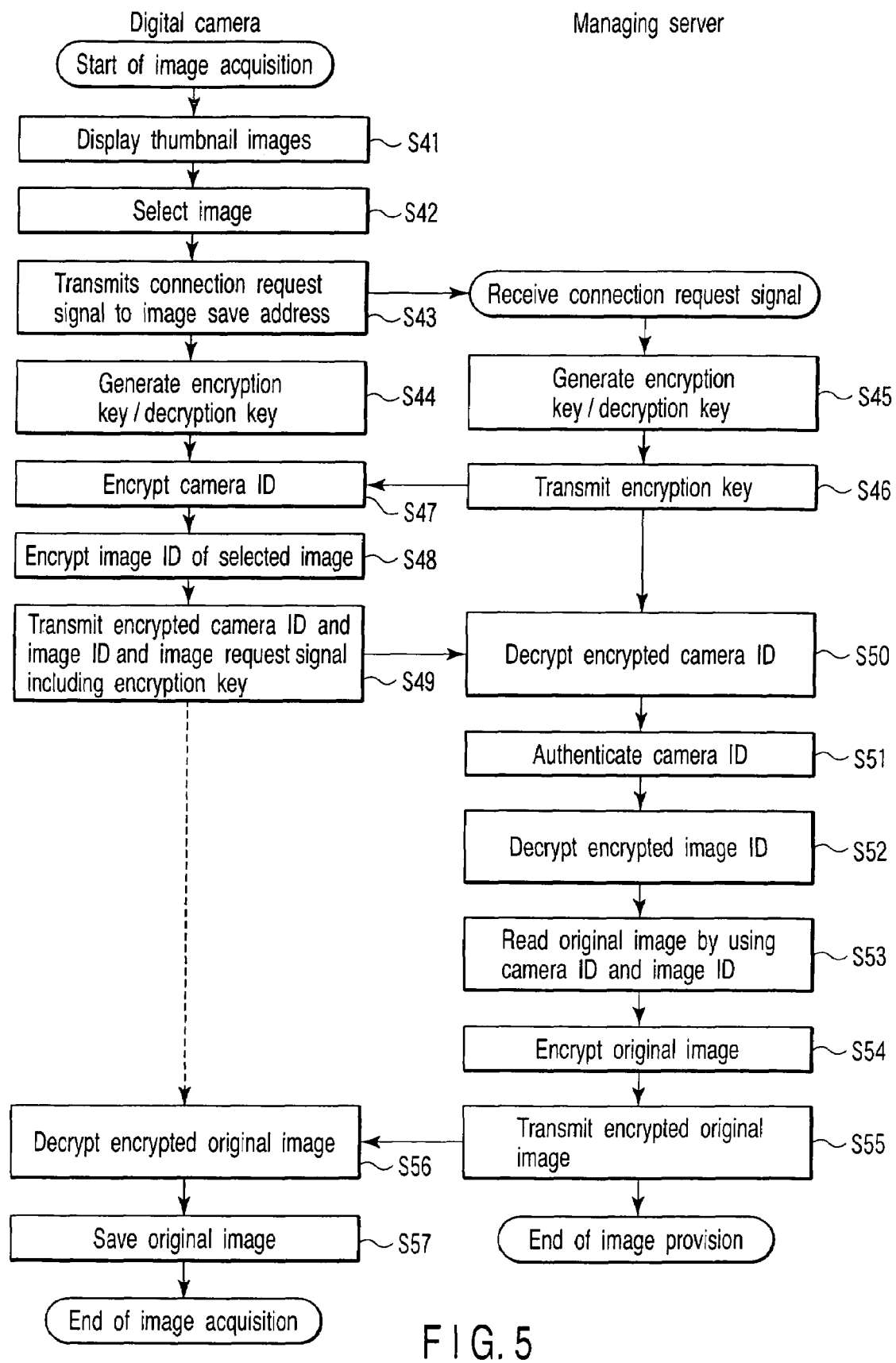
FIG. 5 is a flowchart showing a processing content of acquiring a desired original image from the managing server.

FIG. 2 is a general flowchart showing an operation of the shooting managing system, and FIGS. 3 to 5 are flowcharts showing respective processing operations in the general flowchart.

In a step S1 in FIG. 2, there is carried out processing of registering a user and acquiring a camera ID. In a step 2, processing of transmitting an original image (original image data) obtained by shooting to the managing server 2 is performed. In a step S3, processing of acquiring a desired original image from the managing server 2 based on a choice by a user is carried out.

FIG. 3 is a flowchart sowing a processing content in the step S1. That is, this drawing shows processing of registering a user and acquiring a camera ID. FIG. 3 shows operations of both the digital camera 1 and the managing server 2.

In a step S6 in FIG. 3, in the digital camera 1, the communicating portion 14 transmits a connection request signal to the managing server 2. This connection request signal includes a communication address of the digital camera 1.

In the managing server 2, when the communicating portion 24 receives the connection request signal, the encryption key generation portion 22 generates a server encryption key and a server decryption key in steps S7 and S8. Further, the communicating portion 24 transmits a user information request signal including this server encryption key to the digital camera 1. It is to be noted that the encryption key and the decryption key generated by the encryption key generation portion 22 will be referred to as a server encryption key and a server decryption key hereinafter.

In the digital camera 1, when the communicating portion 14 receives the user information request signal including the server encryption key, a user inputs user information in a step S9. In this example, the user information includes information concerning a user, e.g., a name, an address, a telephone number, an account number for settlement, a credit card number and others, or information such as a communication address of a digital camera. In a step S10, the encryption/decryption portion 6 encrypts the input user information. This encryption is effected by using the server encryption key acquired from the managing server 2. In steps S11 to S12, the encryption key generation portion 12 generates a camera encryption key and a camera decryption key, and the encrypted user information and the generated camera encryption key are transmitted from the communicating portion 14 to the managing server 2. It is to be noted that the encryption key and the decryption key generated by the encryption key generation portion 12 will be referred to as a camera encryption key and a camera decryption key hereinafter.

In the managing server 2, when the communicating portion 24 receives the encrypted user information and the camera encryption key, the encryption/decryption portion 20 decrypts the encrypted user information in a step S13. This decryption is carried out by using the server decryption key generated in the step S8. Subsequently, in steps S14 and S15, the decrypted user information is registered, i.e., stored in the management DB 21, and the management ID generation portion 19 issues, i.e., generates a camera ID. In a step S16, the encryption/decryption portion 20 encrypts the issued camera ID. On the other hand, the camera ID is registered in the management ID 21 in association with the registered user information. Encryption of the camera ID is carried out by using the camera encryption key acquired from the digital camera 1. Then, in a step S17, the encrypted camera ID is transmitted from the communicating portion 24 to the digital camera 1.

In the digital camera 1, when the communicating portion 14 receives the encrypted camera ID, the encryption/decryption portion 6 decrypts the encrypted camera ID in steps S18 and S19. The decrypted camera ID is stored in the camera ID memory 5. It is to be noted that this decryption is performed by using the camera decryption key generated in a step S11.

It is to be noted that the camera ID generated in the step S15 may be either information which specifies the digital camera 1 main body or information which specifies the user of the digital camera 1. In cases where the camera ID is the information which specifies the user, when the digital camera 1 must be specified, the managing server 2 executes processing of specifying the digital camera 1 based on information such as a communication address of the digital camera included in the user information stored in the management DB 21.

When the camera ID is the information which specifies the digital camera 1 main body, the managing server 2 can readily consolidate images shot by the same user utilizing the plurality of digital cameras 1. Therefore, this is suitable for an example where images shot by the digital camera are printed, which will be described in connection with a second embodiment (later).

It is to be noted that the processing in the step S1 in FIG. 2 is not restricted to the processing shown in FIG. 3, and this processing can be performed through, e.g., the Internet. In this case, the following configuration can suffice. The managing server 2 is connected with the Internet. A user connects to the Internet by using, e.g., a personal computer (PC), and accesses the managing server 2 in order to register user information such as a communication address of the digital camera 1. Then, the user acquires a camera ID from the managing server 2, and downloads the acquired camera ID to the camera ID memory 5 of the digital camera 1.

FIG. 4 is a flowchart showing a processing content in the step S2. That is, this flowchart shows processing of performing shooting and transmitting an original image to the managing server 2.

When a user of the digital camera 1 presses a shutter button provided to the operation portion 11, pressing of the shutter button is detected and the imaging portion 7 shoots an image in steps S21 and 22. In steps S23 to S25, the reduced image generating portion 8 generates thumbnail image data based on original image data obtained by shooting. The image ID generation portion 13 generates an image ID. Then, the generated thumbnail image data and the image ID are saved (stored) in the image memory 9 in association with each other. Then, in step S26, the communicating portion 14 transmits an encryption key request signal to the managing server 2.

In the managing server 2, when the communicating portion 24 receives the encryption key request signal, the encryption key generation portion 22 generates a server encryption key and a server decryption key in steps S27 and S28. The communicating portion 24 transmits the generated server encryption key to the digital camera 1.

In the digital camera 1, when the communicating portion 14 receives the server encryption key, the encryption/decryption portion 6 encrypts the original image data, the image ID and the camera ID stored in the camera ID memory 5 in a step S29. It is to be noted that this encryption is carried out by using the server encryption key acquired from the managing server 2. Subsequently, in a step S30, the communicating portion 14 transmits the encrypted original image data, image ID and camera ID to the managing server 2.

In the managing server 2, when the communicating portion 24 receives the encrypted original image data, image ID and camera ID, the encryption/decryption portion 20 decrypts these original image data, image ID and camera ID in a step S31. It is to be noted that this decryption is performed by using the server decryption key generated in the step S27. Furthermore, in a step S32, the decrypted camera ID is authenticated. In authentication of the camera ID, whether the user information associated with the decrypted camera ID is registered in the management DB 21 is judged. If it is determined that the user information is registered, it is decided that the camera ID is proper, and processing in a step S33 and subsequent steps is performed. However, if it is determined that the user information is not registered, it is decided that the camera ID is improper, and processing in the step S33 and subsequent steps is not executed.

When the camera ID is authenticated, in the step S33, the watermark combination portion 23 generates watermark data and combines this data with the original image data decrypted in the step S31. Moreover, in a step S34, the original image data combined with the watermark data, the decrypted image ID and the decrypted camera ID are saved in the image information DB 18 in association with each other. Subsequently, in a step S35, a save address of the image information DB 18 is determined as an image save result, and the communicating portion 24 transmits this result to the digital camera 1.

In the digital camera 1, when the communicating portion 14 receives the image save result, the image save address and the image ID are stored in the image memory in association with each other and the user is notified of termination of shooting in steps S36 and S37. This notification of termination of shooting is performed by, e.g., displaying a message about this termination in the display portion 10.

The processing in the steps S21 to S37 is repeated every time the shutter of the digital camera 1 is operated.

When shooting is performed by the processing shown in FIG. 4, thumbnail image data of a shot image is saved in the image memory 9 of the digital camera 1. On the other hand, original image data of a shot image is saved in the image information DB 18 of the managing server 2.

FIG. 5 is a flowchart showing a processing content in the step S3. That is, this drawing shows processing of acquiring a desired original image by using the managing server.

In the digital camera 1, in a step S41, thumbnail images are displayed in the display portion 10 based on thumbnail image data stored in the image memory 9. When a user selects a desired thumbnail image from these thumbnail images through the operation portion 11 in a step S42, the communicating portion 14 transmits a connection request signal to an image save address in the managing server 2. Then, in a step S44, the encryption key generation portion 12 generates a camera encryption key and a camera decryption key.

On the other hand, in the managing server 2, when the communicating portion 24 receives the connection request signal, the encryption key generation portion 22 generates a server encryption key and a server decryption key and the communicating portion 24 transmits the server encryption key to the digital camera 1 in steps S45 and S46.

In the digital camera 1, when the communicating portion 14 receives the server encryption key, the encryption/decryption portion 6 encrypts a camera ID stored in the camera ID memory 5 in a step S47. It is to be noted that this encryption is performed by using the server encryption key acquired from the managing server 2. In a step S48, the encryption/decryption portion 6 encrypts an image ID associated with the thumbnail image selected in the step S42. It is to be noted that this encryption is carried out by using the server encryption key acquired from the managing server 2. Subsequently, in a step S49, the communicating portion 14 transmits the camera ID encrypted in the step S47, the image ID encrypted in the step S48 and the camera encryption key generated in the step S44 to the managing server 2.

In the managing server 2, when the communicating portion 24 receives the encrypted camera ID and image ID and the camera encryption key, the encryption/decryption portion 20 decrypts this camera ID in a step S50. It is to be noted that this decryption is carried out by using the server decryption key generated in the step S45. Then, in a step S51, the decrypted camera ID is authenticated.

In authentication of the camera ID, whether user information associated with the decrypted camera ID is registered in the management DB 21 is judged. If it is determined that the user information is registered, it is decided that the camera ID is proper, and processing in a step S52 and subsequent steps is executed. However, if it is determined that the user information is not registered, it is decided that the camera ID is improper, and the processing in the step S52 and the following steps is not executed.

When the camera ID is authenticated, the encryption/decryption portion 20 decrypts the received image ID in a step S52. It is to be noted that this decryption is performed by using the server decryption key generated in the step S45. Subsequently, in steps S53 and S54, original image data associated with the decrypted camera ID and image ID is read from the image information DB 18, and the encryption/decryption portion 20 encrypts this original image data. It is to be noted that this encryption is carried out by using the camera encryption key acquired from the digital camera 1. Then, in a step S55, the communicating portion 24 transmits the encrypted original image data to the digital camera 1.

In the digital camera 1, when the communicating portion 14 receives the encrypted original image data, the encryption/decryption portion 6 decrypts the encrypted original image data in steps S56 and S57. The decrypted original image data is saved in the image memory 9. It is to be noted that the decryption in the step S56 is effected by using the camera decryption key generated in the step S44.

When a desired thumbnail image is selected from the displayed thumbnail images by the processing shown in FIG. 5, original image data corresponding to this thumbnail image is acquired from the managing server 2 and saved in the image memory 9.

As described above, according to this embodiment, an original image of a shot image is provided to a person alone who has been registered as a user and acquired a camera ID as required. Therefore, in a place like a concert hall where shooting is restricted, an image taken under certain conditions can be provided while restricting shooting. For example, when the number of photos to be taken is restricted, it is possible to obtain an image which is a favorite one of a user from many taken images.

It is to be noted that, in this embodiment, for example, a person who requests restriction of shooting can lend the above-described digital camera 1 to a person who is a target of shooting restriction in order to allow shooting. In this case, it is good enough for a person who is a target of shooting restriction to register user information when renting the digital camera 1. In this case, a camera ID is previously stored in the camera ID memory 5 of the digital camera 1 to be rented. The registered user information includes a communication address of this digital camera 1. The user information including this communication address is associated with the camera ID of this digital camera 1, and registered in the management DB 21 in the managing server 2.

Additionally, in a step S55, the encrypted original image data may be transmitted to a destination address specified by a user. In this case, information indicative of a transmission result is transmitted to the digital camera 1, and this transmission result information is saved and displayed in a step S57. It is to be noted that the destination address of the original image data is specified by user information input processing shown in the step S9 in FIG. 3.

Further, in the steps S29 and S30 shown in FIG. 4, the original image, the image ID and the camera ID may be transmitted to the managing server 2 as they are without being encrypted. In this case, generation of the encryption key and the decryption key and transmission of the encryption key are not carried out in the steps S27 and S28, and decryption of the original image, the image ID and the camera ID is not executed in the step S31.

Furthermore, in the steps S47 to S49 in FIG. 5, the camera ID and the image ID may be transmitted to the managing server 2 together with the camera encryption key as they are without being encrypted. In this case, generation of the server encryption key and the server decryption key and transmission of the server encryption key are not executed in the steps S45 and S46, and decryption of the camera ID and decryption of the image ID are not carried out in the steps S50 and S52.

Second Embodiment EMBODIMENT

In the second embodiment, a shot image is provided to a user as a print image instead of original image data.

Figure 6:
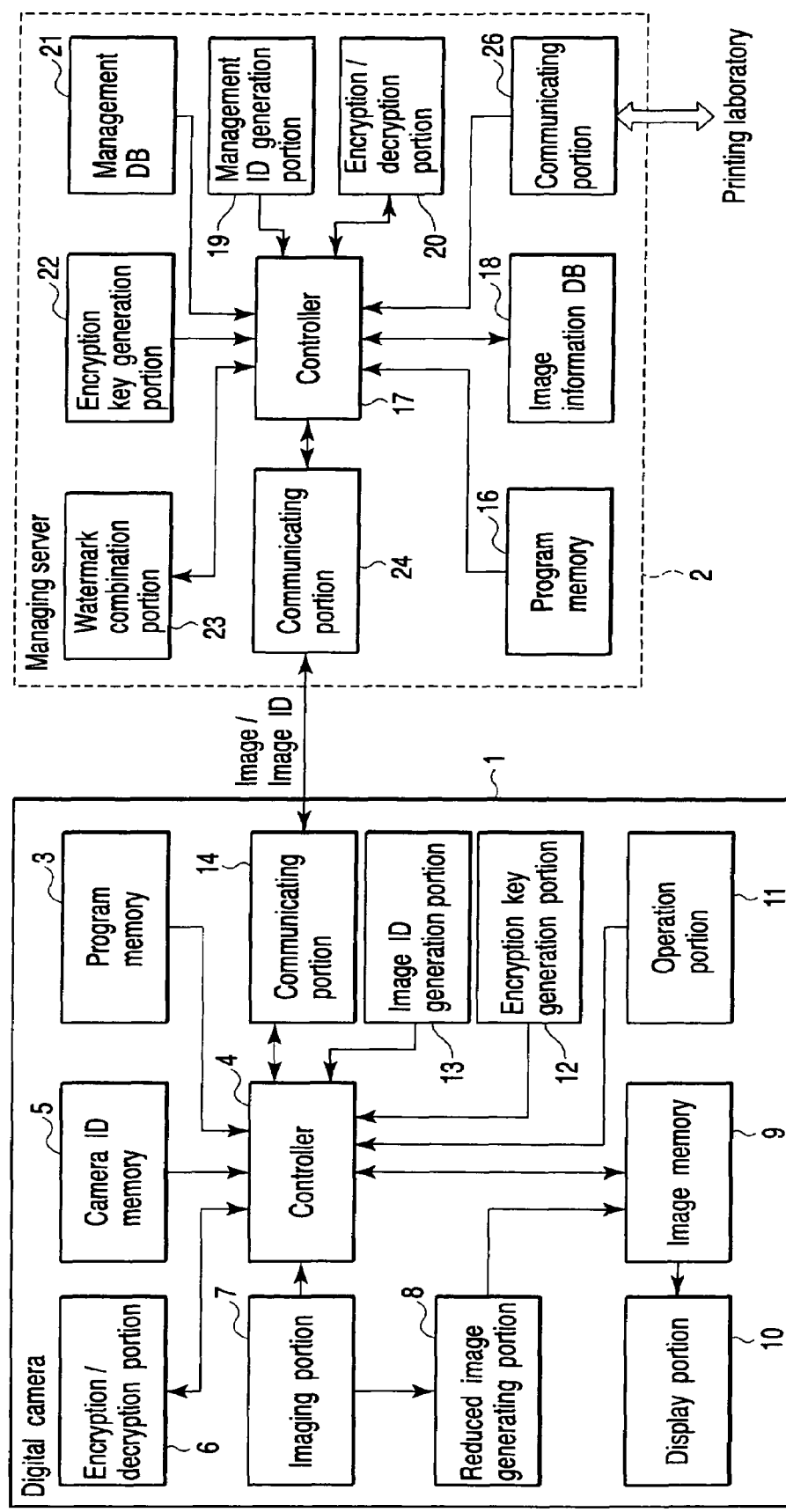
FIG. 6 is a block diagram showing a configuration of a shooting managing system according to a second embodiment.

FIG. 6 is a block diagram showing a configuration of a shooting managing system according to the second embodiment of the present invention. This system is different from the system according to the first embodiment in that the managing server 2 further has a communicating portion 26 which transmits/receives information to/from a printer (not shown) of a printing contractor (a printing laboratory) via radio waves or a cable. Any other configuration is the same as the first embodiment.

Figure 7:
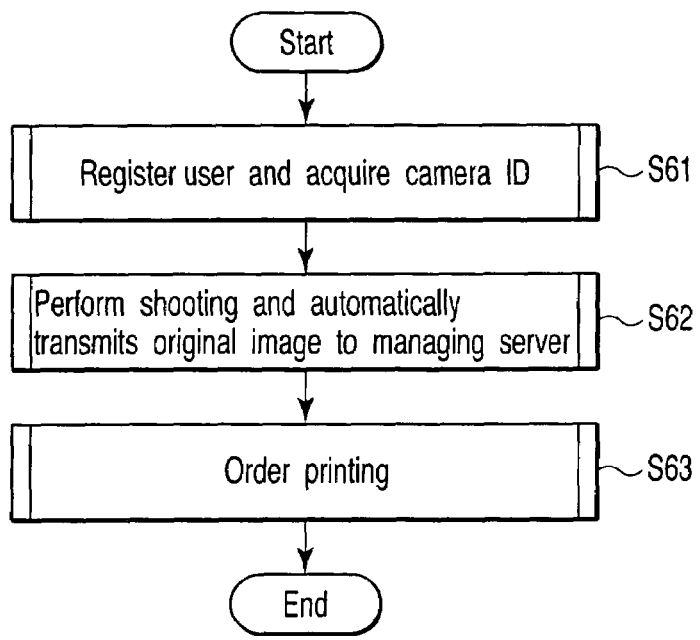
FIG. 7 is a general flowchart showing an operation of the shooting managing system according to the second embodiment.
Figure 8:
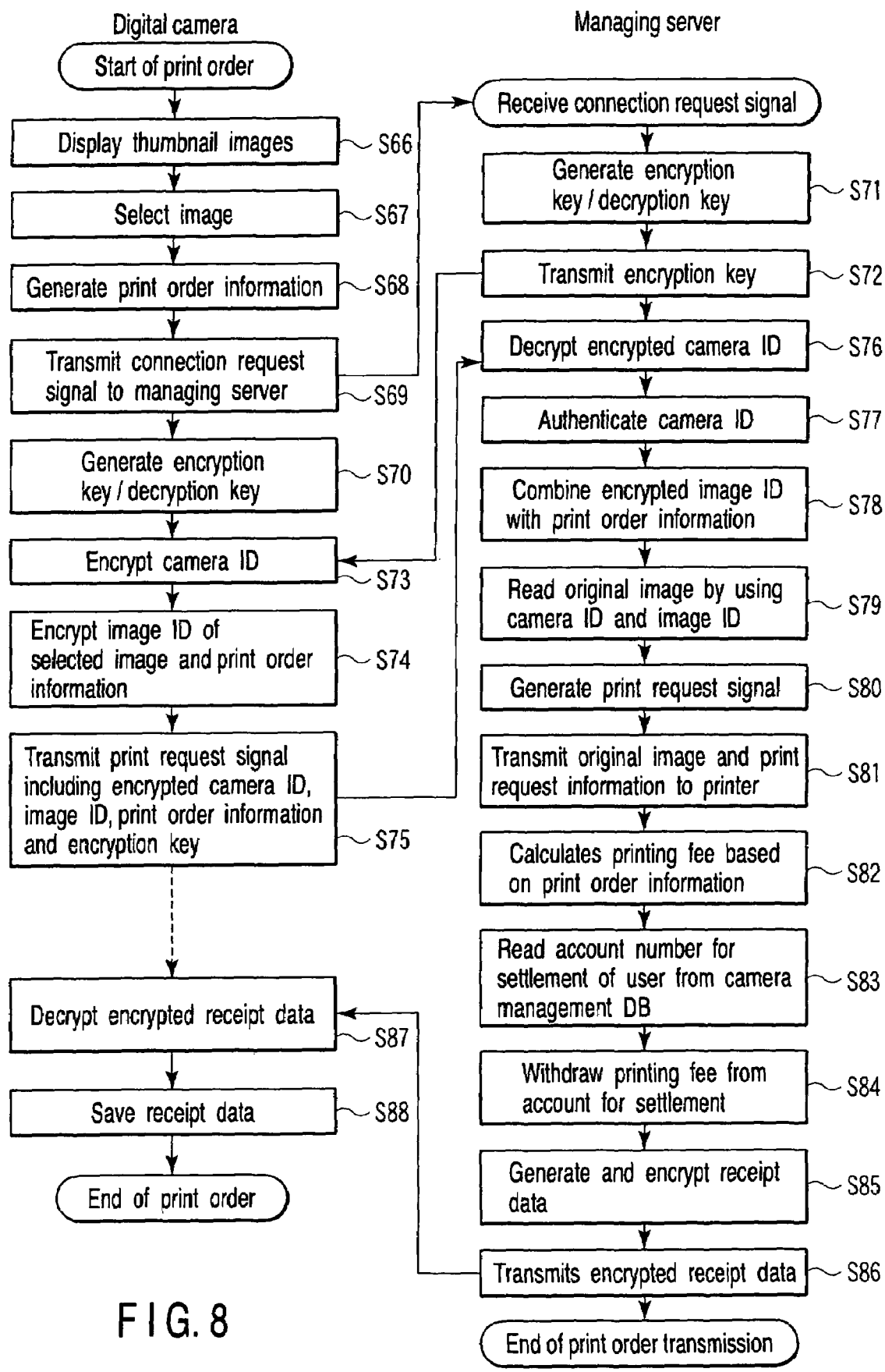
FIG. 8 is a flowchart showing a processing content of placing a print order.

FIG. 7 is a general flowchart showing an operation of the shooting managing system according to this embodiment. FIG. 8 is a flowchart showing a part of a processing operation in the general flowchart.

In a step S61 in FIG. 7, processing of registering a user and acquiring a camera ID is performed. In a step S62, processing of transmitting an original image (original image data) obtained by shooting to the managing server 2 is executed. Then, in a step S63, processing of placing an order of printing a desired original image by using the managing server 2 in accordance with an instruction of the user is performed. It is to be noted that the processing in the steps S61 and S62 shown in FIG. 7 is the same as that in the steps S1 and S2 depicted in FIG. 2 according to the first embodiment, thereby eliminating the detailed description of the processing.

FIG. 8 is a flowchart showing a processing content in the step S63. That is, this drawing shows processing of placing a print order.

In the digital camera 1, in a step S66, thumbnail images are displayed in the display portion 10 based on thumbnail image data stored in the image memory 9. In steps S67 and S68, a user selects a desired thumbnail image from the thumbnail images through the operation portion 11, and inputs data required to place a print order through the operation portion 11. As a result, print order information is generated. Here, the generated print order information includes information concerning, e.g., a print size, the number of photos to be printed, print finishing and others. Subsequently, in a step S69, the communicating portion 14 transmits a connection request signal to the managing server 2. This connection request signal includes a communication address of the digital camera 1 as information. Then, in a step S70, the encryption key generation portion 12 generates a camera encryption key and a camera decryption key.

On the other hand, in the managing server 2, when the communicating portion 24 receives the connection request signal, the encryption key generation portion 22 generates a server encryption key and a server decryption key and the communicating portion 24 transmits the server encryption key to the digital camera 1 in steps S71 and S72.

In the digital camera 1, when the communicating portion 14 receives the server encryption key, the encryption/decryption portion 6 encrypts a camera ID stored in the camera ID memory 5 in a step S73. It is to be noted that this encryption is performed by using the server encryption key acquired from the managing server 2. Subsequently, in a step S74, the encryption/decryption portion 6 encrypts an image ID associated with the thumbnail image selected in the step S67 and the print order information generated in the step S68. It is to be noted that this encryption is performed by using the server encryption key acquired from the managing server 2. Then, in a step S75, the communicating portion 14 transmits the camera ID encrypted in the step S73, the image ID and the print order information encrypted in the step S74 and the camera encryption key generated in the step S70 to the managing server 2.

In the managing server 2, when the communicating portion 24 receives a print request signal including the encrypted camera ID, image ID and print order information and the camera encryption key, the encryption/decryption portion 20 decrypts this camera ID in a step S76. It is to be noted that this decryption is performed by using the server decryption key generated in the step S71. Then, in a step S77, the decrypted camera ID is authenticated. Since a technique of this authentication is the same as the technique described in connection with the step S51 in FIG. 5, thereby eliminating the tautological explanation.

When the camera ID is authenticated, the encryption/decryption portion 20 decrypts the encrypted image ID and print order information in a step S78. It is to be noted that this decryption is carried out by using the serer decryption key generated in the step S71. In steps S79 and S80, original image data associated with the camera ID decrypted in the step S76 and the image ID decrypted in the step S78 is read from the image information DB 18. In the step S80, print request information is generated. This print request information includes information concerning an address and others included in the user information registered in the management DB 21 and the print order information decrypted in the step S78. Further, in a step S81, the communicating portion 26 transmits the print request information and the original image data read in the step S79 to the printer of the printing contractor, i.e., a communication address of the printer. In a step S82, a printing fee is calculated in accordance with the decrypted print order information. Then, in steps S83 and S84, user information associated with the camera ID is checked by referring to the management DB 21, and an account number for settlement is read from this user information. Furthermore, processing of withdrawing the printing fee calculated in the step S82 from the account for settlement concerning the account number for settlement is carried out. Then, in a step S85, receipt data is generated as information which notifies the fact that the printing fee is withdrawn from the account for settlement of the user. Moreover, the encryption/decryption portion 20 encrypts the receipt data. It is to be noted that this encryption is carried out by using the camera encryption key acquired from the digital camera 1. In a step S86, the encrypted receipt data is transmitted to the digital camera 1.

In the digital camera 1, when the communicating portion 14 receives the encrypted receipt data, the encryption/decryption portion 6 decrypts the encrypted receipt data in steps S87 and S88. The decrypted receipt data is saved in a predetermined memory, e.g., the image memory 9. It is to be noted that the decryption in the step S87 is executed by using the camera decryption key generated in the step S70.

When the desired thumbnail image as a print target is selected from the displayed thumbnail images and the print order information is input by the above-described processing shown in FIG. 8, a request of printing an original image concerning this thumbnail image is issued to the printing contractor. Additionally, a printing fee concerning this print order is withdrawn.

Incidentally, in the printer of the printing contractor, upon receiving the original image data and the print request information transmitted from the managing server 2, an original image is printed based on the original image data in accordance with the print order information included in the print request information. Then, the printed image is delivered or mailed to a specific address included in the print request information so that a user can receive the printed image.

As described above, according to this embodiment, a printed image of a taken image is provided to a person alone who has been registered as a user and acquired a camera ID as required. Therefore, in a place like a concert hall where shooting is restricted, an image taken under certain conditions can be provided as a pay printed image while restricting shooting.

Incidentally, in the step S81 in FIG. 8, when transmitting the original image data and the print request information to the printer, the original image data, the information concerning an address and others included in the print request information and the print order information may be encrypted and then transmitted.

Further, in the steps S73 to S75, the camera ID, the image ID and the print order information may be transmitted to the managing server 2 together with the camera encryption key as they are without being encrypted. In this case, the server encryption key and the server decryption key are not generated in the steps S71 and S72. Furthermore, decryption of the camera ID and decryption of the image ID and the print order information are not executed in the steps S76 and S78.

On the other hand, the same step as the accounting processing described in connection with FIG. 8 may be added to the first embodiment. In this case, the original image data itself is provided with a fee, and a fee is determined in accordance with the number of images transmitted to the digital camera 1 in the step S55 shown in FIG. 5 according to the first embodiment. This fee is withdrawn from an account for settlement of a user. It is to be noted that a size of image data may be specified and a fee may differ depending on a specified size. In this case, before encrypting the original image data in the step S54, resizing processing of changing a size of an image to a size specified by a user is carried out.

Third Embodiment

In the third embodiment, taken original image data is encrypted and saved by the digital camera 1. Then, the digital camera 1 decrypts an encrypted original image by using a decryption key transmitted from the managing server 2, thereby providing the decrypted original image to a user.

Figure 9:
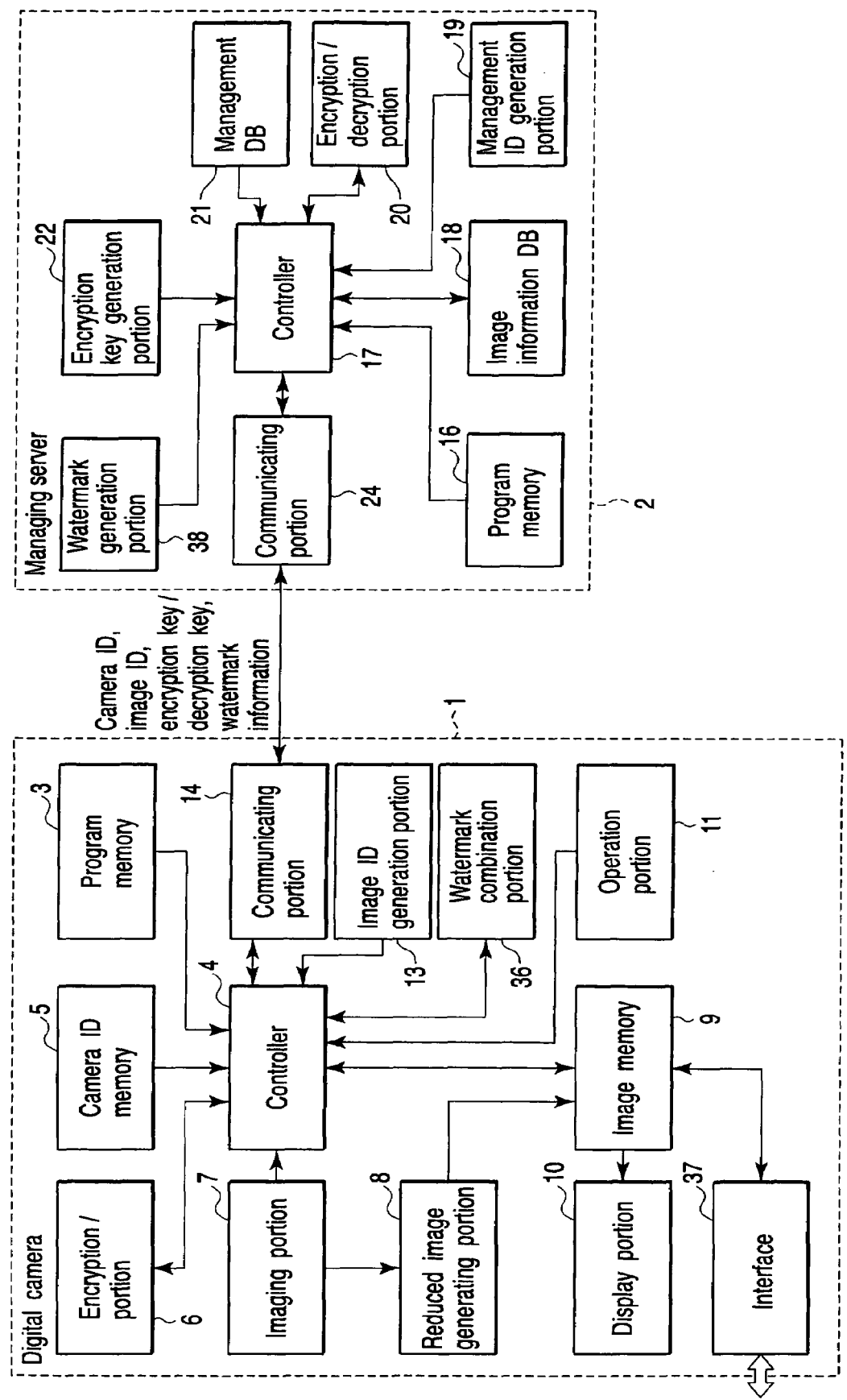
FIG. 9 is a block diagram showing a configuration of a shooting managing system according to a third embodiment.

FIG. 9 is a block diagram showing a configuration of a shooting managing system according to the third embodiment of the present invention.

The shooting managing system according to the third embodiment is different from the first embodiment in that the digital camera 1 further has a watermark combination portion 36 which combines watermark data and an interface 37 which transmits/receives information to/from an external device connected the digital camera 1 and that the encryption key generation portion 12 is eliminated. Moreover, this embodiment is different from the first embodiment in that the managing server 2 has a watermark generation portion 38 which generates watermark data in place of the watermark combination portion 23. Any other configuration is the same as the first embodiment.

In the shooting managing system according to the third embodiment, "processing of registering a user and acquiring a camera ID" is first executed. Since this processing is the same as the processing shown in the step S1 in FIG. 2 according to the first embodiment, thereby eliminating the detailed explanation. Then, "processing of performing shooting and encrypting and saving an original image (FIG. 10)" is executed. Subsequently, at last, "processing of decrypting the encrypted original image (FIG. 11)" is executed. An operation of the shooting managing system will now be described hereinafter with reference to FIGS. 10 and 11.

Figure 10:
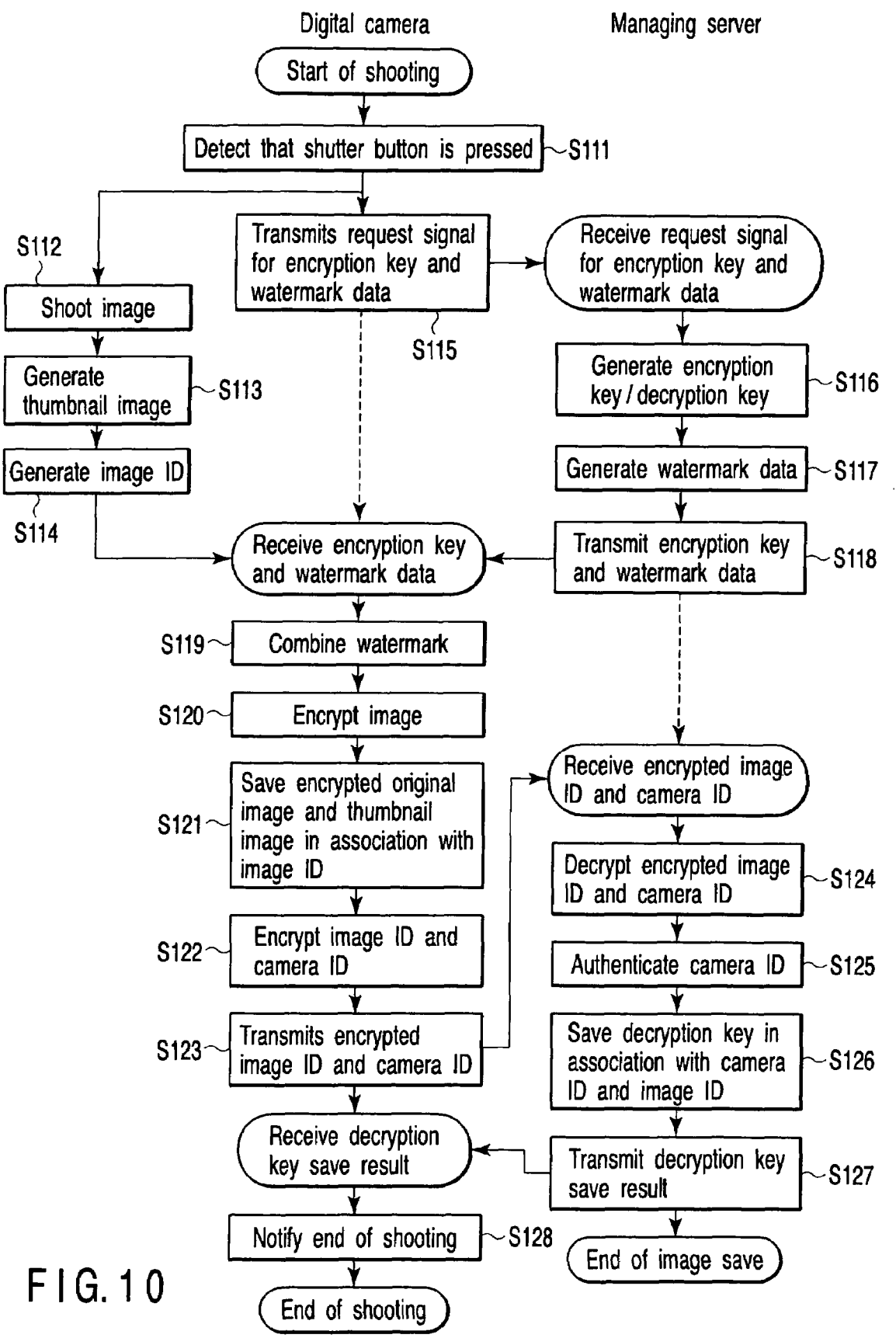
FIG. 10 is a flowchart showing a processing content of performing shooting and encrypting and saving an original image.

FIG. 10 is a flowchart showing a processing content of performing shooting and encrypting and saving an original image.

When a user of the digital camera 1 presses a shutter button provided to the operation portion 11, pressing of the shutter button is detected in a step S111. In steps S112 to 114, the imaging portion 7 takes an image. The reduced image generating portion 8 generates thumbnail image data based on original image data obtained by the shooting. The image ID generation portion 13 generates an image ID.

On the other hand, processing in a step S115 is executed concurrently with the processing at these steps S112 to S114. That is, the communicating portion 14 transmits a request signal for an encryption key and watermark data to the managing server 2.

In the managing server 2, when the communicating portion 24 receives the request signal for the encryption key and the watermark data, the encryption key generation portion 22 generates a server encryption key and a server decryption key corresponding to the server encryption key in steps S116 and S117. The watermark generation portion 38 generates watermark data. Then, in a step S118, the communicating portion 24 transmits the generated server encryption key and the generated watermark data to the digital camera 1.

In the digital camera 1, when the communicating portion 14 receives the server encryption key and the watermark data, the watermark data combination portion 36 combines the watermark data with the original image data in steps S119 and S120. The encryption/decryption portion 6 encrypts the combined original image data. Subsequently, in a step S121, the encrypted original image data and the generated thumbnail image data are saved in the image memory 9 in association with the image ID. It is to be noted that the encryption of the original image data in the step S120 is performed by using the server encryption key acquired from the managing server 2.

Then, in steps S122 and S123, the encryption/decryption portion 6 encrypts the image ID and a camera ID stored in the camera ID memory 5. The communicating portion 14 transmits the encrypted image ID and camera ID to the managing server 2. It is to be noted that the encryption in the step S122 is executed by using the server encryption key acquired from the managing server 2.

In the managing server 2, when the communicating portion 24 receives the encrypted image ID and camera ID, the encryption/decryption portion 20 decrypts the encrypted image ID and camera ID in a step S124. Then, in a step S125, the camera ID is authenticated. In this authentication, if the camera ID is authenticated as a proper ID, processing in a step S126 and subsequent steps is executed.

In the step S126, the decrypted image ID and camera ID are saved in the image information DB 18 in association with the generated decryption key. It is to be noted that the decryption in the step S124 is carried out by using the server decryption key generated in the step S116. Subsequently, in a step S127, the communicating portion 24 transmits a decryption key save result which notifies of the fact that the server decryption key has been saved to the digital camera 1.

In the digital camera 1, when the communicating portion 14 receives the decryption key save result, a user is notified of termination of shooting in a step S128. This notification of termination of shooting is performed by, e.g., displaying a message notifying this termination in the display portion 10.

The processing in the steps S111 to S128 described above is repeated every time the shutter of the digital camera 1 is operated.

When the shooting is effected based on the processing shown in FIG. 10, original image data concerning a taken image is encrypted and saved in the image memory 9 of the digital camera 1, and a decryption key which is used to decrypt the encrypted original image data is saved in the image information DB 18 of the managing server 2.

Figure 11:
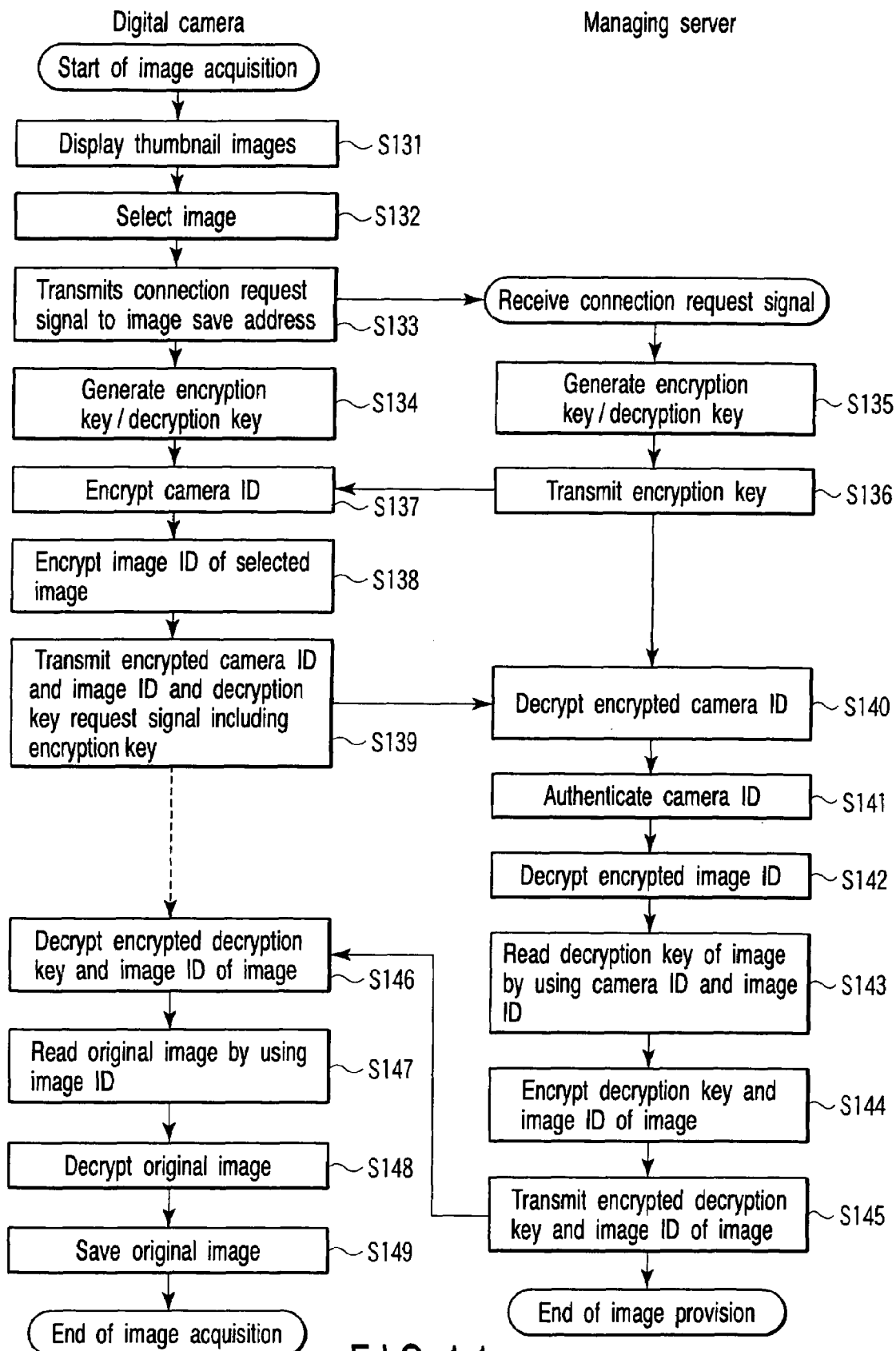
FIG. 11 is a flowchart showing a processing content of decrypting an encrypted original image.

FIG. 11 is a flowchart showing a processing content of decrypting an encrypted original image.

Processing in steps S131 to S142 in FIG. 11 is the same as the processing in the steps S41 to S52 in FIG. 5 according to the first embodiment. However, although the image request signal is transmitted in the step S49, a step S139 in this embodiment is different from the step S49 in that a decryption key request signal is transmitted.

Following a step S142, in the managing server 2, a server decryption key associated with the decrypted camera ID and image ID is read from the image information DB 18 and the encryption/decryption portion 20 encrypts the server decryption key and the image ID in steps S143 and S144. It is to be noted that this encryption is performed by using the camera encryption key generated in the step S134 in the digital camera 1. Subsequently, in a step S145, the communicating portion 24 transmits the encrypted server decryption key and image ID to the digital camera 1.

In the digital camera 1, when the communicating portion 14 receives the encrypted server decryption key and image ID for the original image, the encryption/decryption portion 6 decrypts the encrypted server decryption key and image ID for the original image. It is to be noted that this decryption is carried out by using the camera decryption key generated in the step S134. Subsequently, in steps S147 and S148, the encrypted original image data associated with the decrypted image ID is read from the image memory 9. The encryption/decryption portion 6 decrypts the encrypted original image data by using the server decryption key for the original image decrypted in the step S146. Further, in a step S149, the decrypted original image data is saved in the image memory 9.

As described above, when a desired thumbnail image is selected from the displayed thumbnail images by the processing shown in FIG. 11, the encrypted original image data corresponding to the selected thumbnail image is decrypted by using the decryption key transmitted from the managing server 2. Then, the decrypted original image data is saved in the image memory 9.

The original image data saved in the image memory 9 may be saved in an external storage device connected through the interface 37 as required.

As described above, according to this embodiment, the original image of a taken image is provided to a person alone who has been registered as a user and acquired a camera ID as required. Therefore, in a place like a concert hall where the shooting is restricted, an image taken under certain conditions can be provided while restricting the shooting. Furthermore, as different from the shooting managing system according to the first embodiment, since the taken original image is not transmitted between the digital camera 1 and the managing server 2, there is an advantage of reducing a quantity of information to be transmitted between the communicating portion 14 of the digital camera 1 and the communicating portion 24 of the managing server 2.

Fourth Embodiment

The fourth embodiment is different from the first embodiment in that a signal concerning admission of shooting is transmitted from the managing server 2 and the digital camera 1 executes a shooting operation based on this signal. It is to be noted that, in a block diagram shown in conjunction with the fourth embodiment, like reference numerals denote the same parts as those in the first embodiment.

A description will now be given as to a configuration of a shooting managing system according to the fourth embodiment as well as various kinds of modifications thereof.

Figure 12:
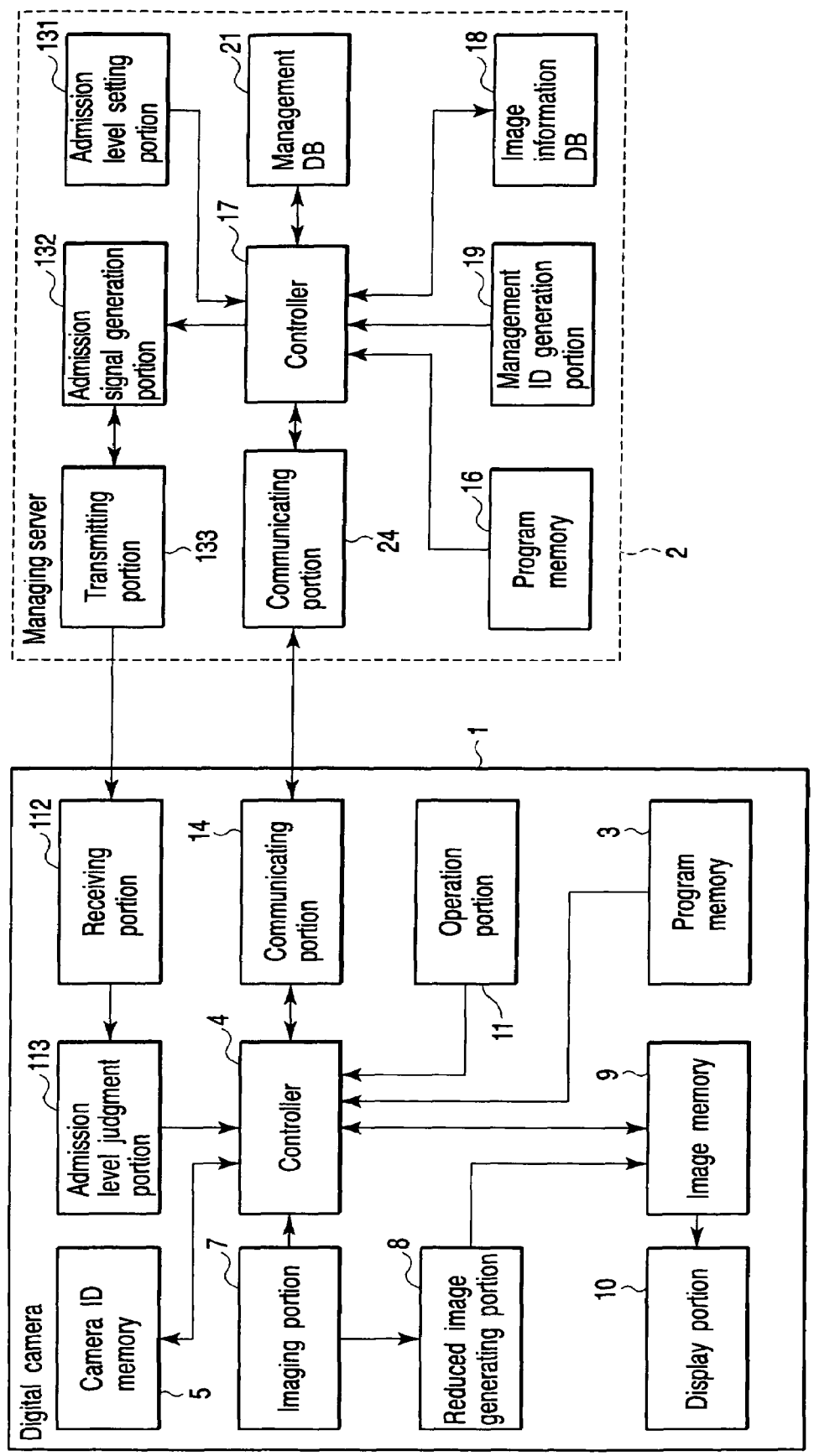
FIG. 12 is a block diagram showing a basic structural example of a shooting managing system comprising a shooting apparatus and a managing server according to the embodiment of the present invention.

FIG. 12 is a block diagram showing a basic structural example of a shooting managing system according to the fourth embodiment of the present invention.

The digital camera 1 is provided with a controller 4, a camera ID memory 5, a receiving portion 112, a communicating portion 14, an admission level judgment portion 113, an imaging portion 7, a reduced image generating portion 8, an image memory 9, a display portion 10, an operation portion 11 and a program memory 3.

The controller 4 entirely controls operations of the digital camera 1. The camera ID memory 5 saves ID information which specifies a digital camera. The communicating portion 14 is a communication interface which performs transmission/reception of information with the managing server 2. The receiving portion 112 receives a shooting management signal as a signal which is transmitted from the managing server 2 and manages the shooting. The admission level judgment portion 113 judges an admission level included in the shooting management signal which is transmitted from the managing server 2 and received by the receiving portion 112, and outputs a result of judgment to the controller 4.

The imaging portion 7 performs the shooting of a subject image and generates image data of this image. The reduced image generating portion 8 generates a thumbnail image as index data of the shot image data. The image memory 9 saves a thumbnail image or the like. The display portion 10 is a liquid crystal display which displays an image or the like. The operation portion 11 is an input device such as an operation button which is used to receive an operation instruction input from a user. The program memory 3 saves a program which is operated in the digital camera 1.

The managing server 2 is provided with a controller 17, an admission level setting portion 131, an admission signal generation portion 132, a transmitting portion 133, a communicating portion 24, a management ID generation portion 19, an image information DB 18, a management DB 21 and a program memory 16.

The controller 17 entirely controls operations of the managing server 2. The admission level setting portion 131 sets an admission level of the shooting performed by the digital camera 1. The admission signal generation portion 132 generates a shooting management signal which is directed to the digital camera in accordance with the set admission level, and the transmitting portion 133 transmits the generated shooting management signal. The communicating portion 24 is a communication interface which performs transmission/reception of information with the digital camera 1. The management ID generation portion 19 generates management ID information which is used to specify an image transmitted from the digital camera 1. The image information DB 18 saves an image transmitted from the digital camera 1. The management DB 21 saves information which is used to manage an image, e.g., the management ID information. The program memory 16 saves a program which is operated in the managing server 2.

In this example, although a signal is transmitted from the transmitting portion 133 of the managing server 2 to the receiving portion 112 of the digital camera 1 in one way, information is transmitted/received between the communicating portion 24 of the managing server 2 and the communicating portion 14 of the digital camera in two ways. It is to be noted that communication functions of these two systems do not have to be physically separated.

An outline of the shooting operation of the shooting managing system will now be described. In this shooting operation, an image taken by the digital camera 1 is transferred to and saved in the managing server 2.

In the managing server 2, a shooting admission level is set by the shooting managing side. Here, as the shooting admission level, there are two levels, i.e., a shooting admission level and a shooting non-admission level. The admission signal generation portion 132 generates a shooting management signal including an admission level code indicative of an admission level, and transmits this signal to the digital camera 1 through the transmitting portion 133.

In the digital camera 1, the admission level judgment portion 113 judges the admission level from the received information. Moreover, in cases where the shooting is admitted, the image data obtained by the shooting performed by the imaging portion 7 based on the shooting operation of the operation portion 11 by a shooter is transmitted to the managing server 2 through the communicating portion 14. That is, the shot image is not saved in the digital camera 1. However, in the digital camera 1, the reduced image generating portion 8 generates a thumbnail image of the image data.

In the managing server 2, the controller 17 saves the received image data in the image information DB 18. Additionally, the management ID generation portion 19 creates management ID information required to specify the received image data, saves this information in the management DB 21, and transmits the management ID information to the digital camera 1 through the communicating portion 24.

In the digital camera 1, the controller 4 saves the management ID information received by the communicating portion 14 and the thumbnail image generated by the reduced image generating portion 8 in the image memory 9 in association with each other.

On the other hand, when the receiving portion 112 of the digital camera 1 receives a signal including an admission code of "non-admission of shooting", the shooting by the imaging portion 7 may be prevented from being executed even if a shooter performs the shooting operation by using the operation portion 11. In case of "admission of shooting", an image taken by the digital camera 1 may be stored in the image memory 9 as it is. When the shooting management signal received by the receiving portion 112 is indicative of "admission of restriction", an image taken by the digital camera 1 may be transmitted to the managing server 2 and saved in this server.

Figure 13:
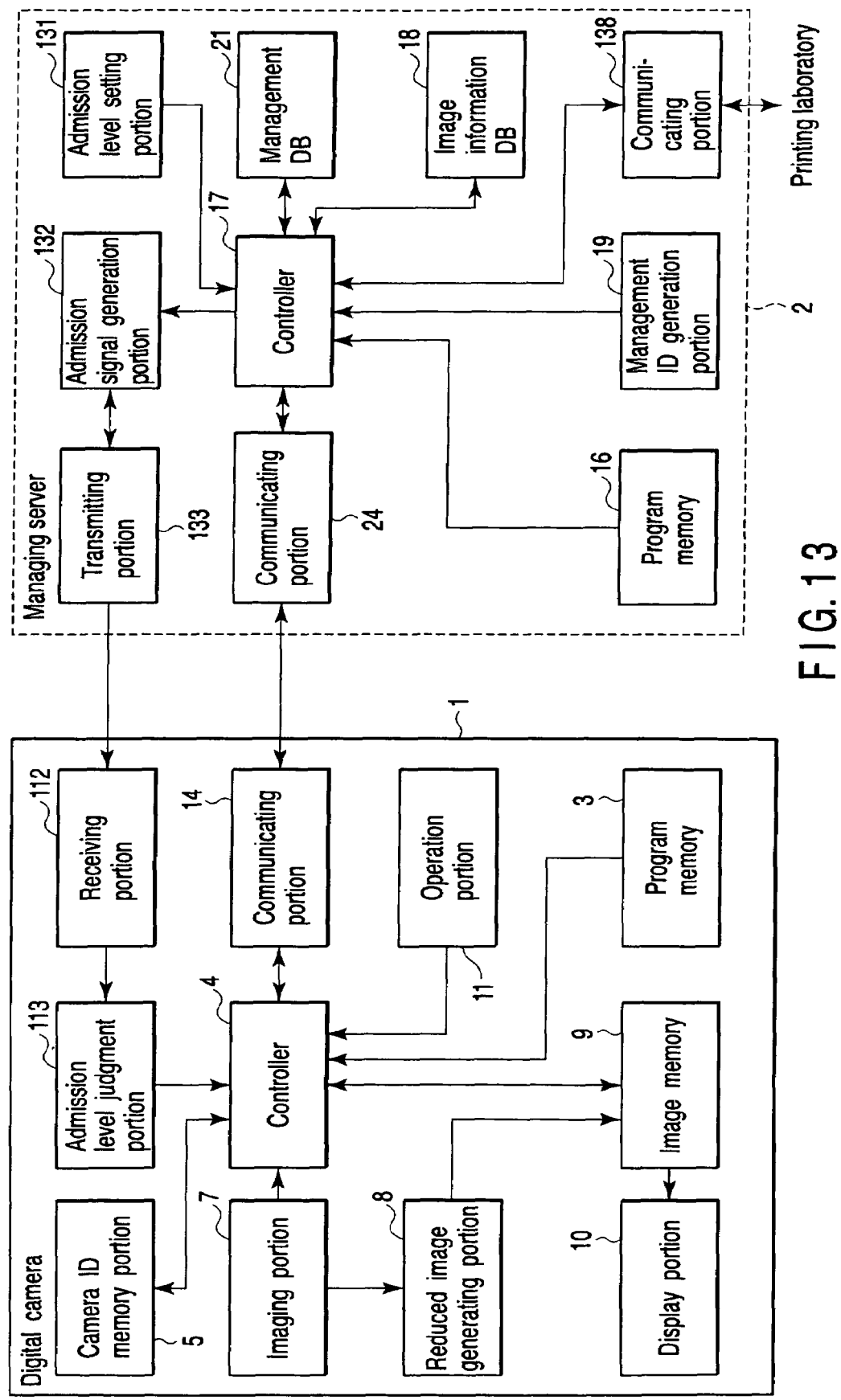
FIG. 13 is a block diagram showing a structural example of a shooting managing system capable of printing.

FIG. 13 is a block diagram showing a structural example of a shooting managing system capable of placing a print order.

Although this structural example capable of placing a print order is the same as the basic structural example depicted in FIG. 12, it is different from the basic structural example in that a communicating portion 138 is provided to the managing server 2. This communicating portion 138 is a communication interface which communicates with a printing laboratory as an external system.

A description will now be given as to an outline of a print order operation of the shooting managing system depicted in FIG. 13. It is to be noted that an image taken by the digital camera 1 based on the shooting operation described in conjunction with the basic structural example depicted in FIG. 12 is stored in the managing server 2. In this print order operation, the digital camera 1 instructs the managing server 2 to print a saved image.

The managing server 2 returns a print order form in accordance with a request from the digital camera 1.

In the digital camera 1, the received order form and thumbnail images stored in the image memory 9 are displayed in the display portion 10. Then, a user selects an image which is desired to be printed by making reference to the thumbnail images. Further, management ID information of the image which is desired to be printed as well as the order form is transmitted to the managing server 2 through the communicating portion 24.

In the managing server 2, the controller 17 specifies the image based on the management ID information, and instructs the printing laboratory to print this image and provide it to the user.

Figure 14:
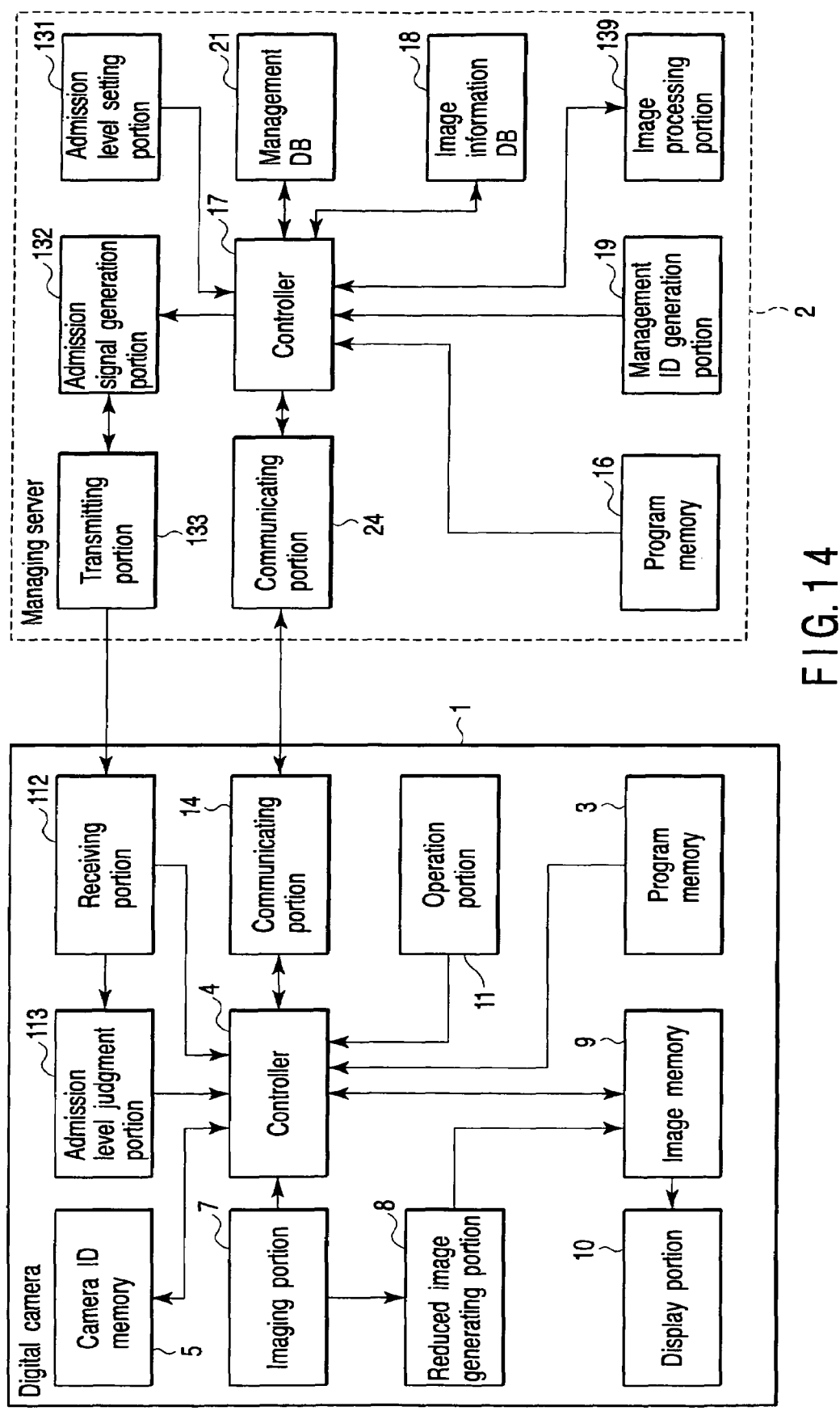
FIG. 14 is a block diagram showing a structural example of the shooting managing system at the time of an image processing operation.

FIG. 14 is a block diagram showing a structural example of a shooting managing system capable of executing image processing.

Although the structure capable of executing image processing is the same as the basic structural example depicted in FIG. 12, this structure is different from the basic structural example in that an image processing portion 139 is provided to the managing server 2. This image processing portion 139 performs image processing such as a reduction in image data or combination of a watermark or a logo mark.

An image processing operation of the shooting managing system depicted in FIG. 14 will now be described. In this image processing operation, an image taken by the digital camera 1 is saved after the managing server 2 performs image processing.

This processing is executed when an image alone whose size is not greater than a size determined by the managing side is allowed to be shot or when a combined image having a logo mark added thereto in order to clarify that the shooting is performed in this event is provided.

Figure 15:
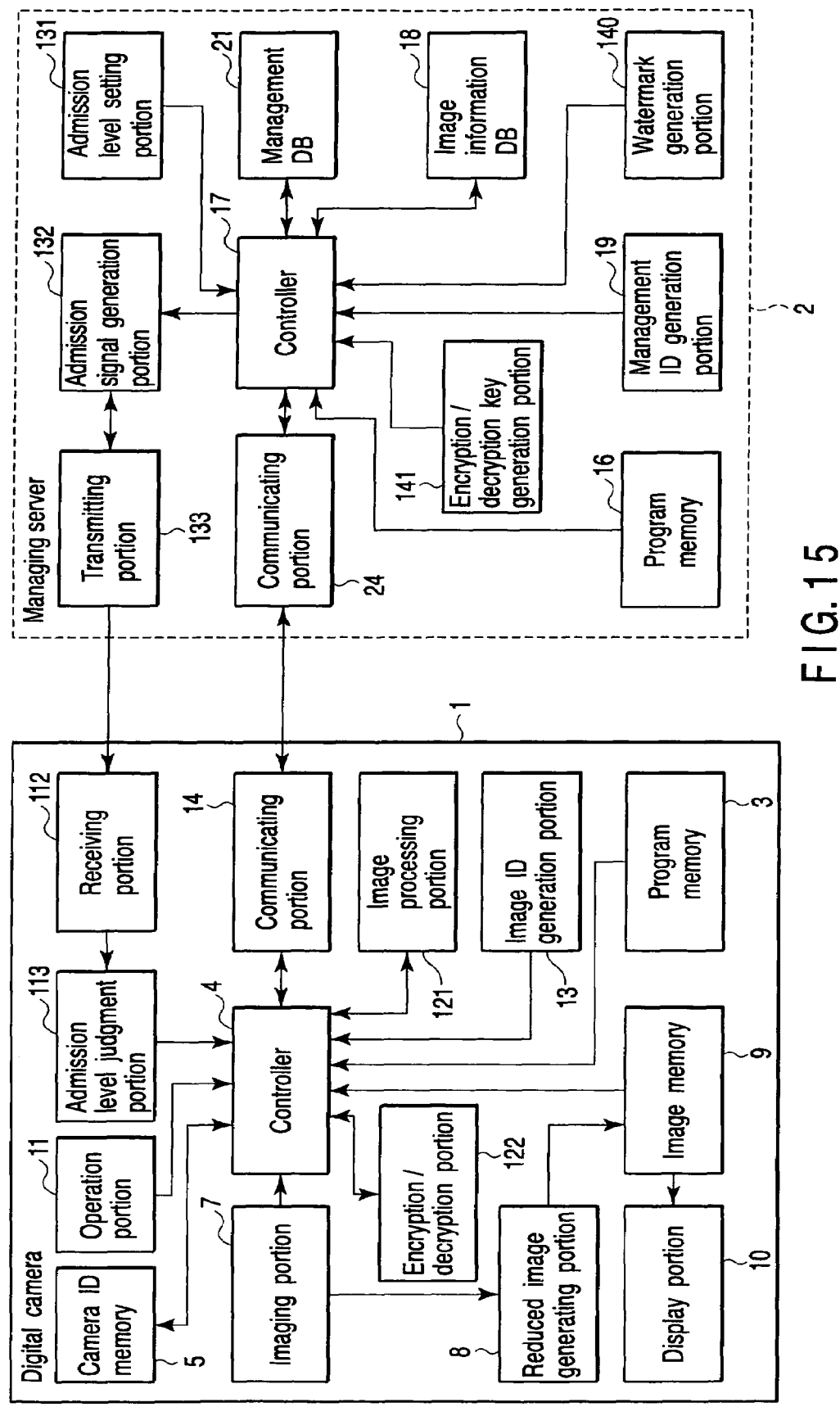
FIG. 15 is a block diagram showing a structural example of the shooting managing system at the time of an image encryption processing operation.

FIG. 15 is a block diagram showing a structural example of a shooting managing system which encrypts and saves an image. Furthermore, in this structural example, image processing of a watermark combination is executed in the digital camera 1.

Although this structural example of encrypting and saving an image is the same as the structure at the time of the basic operation depicted in FIG. 12, it is different from the basic structure in that the digital camera 1 is further provided with an image ID generation portion 13, an image processing portion 121 and an encryption/decryption portion 122 and the managing server 2 is further provided with a watermark generation portion 140 and an encryption/decryption key generation portion 141.

A description will now be given as to an outline of an image encryption processing operation of the shooting managing system depicted in FIG. 15. In this image encryption processing operation, an image taken by the digital camera 1 is encrypted and saved.

In the digital camera 1, the image ID generation portion 13 creates image ID information which is used to specify a taken image, and transmits this image ID information to the managing server 2 through the communicating portion 14. In the managing server 2, the watermark generation portion 140 generates watermark information and the encryption/decryption portion key generation portion 141 creates an encryption key so that these sets of created information are transmitted to the digital camera 1, and a decryption key corresponding to the encryption key is stored in the management DB 21. In the digital camera 1, the image processing portion 121 combines the image data with the received watermark information, and the encryption/decryption portion 122 encrypts a combined image based on the encryption key. Moreover, the encrypted image is saved in the image memory 9.

On the other hand, in case of decryption, the digital camera 1 transmits image ID information of an image which should be decrypted to the managing server 2. In the managing server 2, the encryption/decryption key generation portion 141 reads a decryption key which is used to decrypt this image based on the image ID information from the management DB 21, and transmits this key to the digital camera 1. In the digital camera 1, the encryption/decryption portion 122 decrypts the image based on the decryption key.

It is to be noted that, in FIGS. 13 to 15, when the receiving portion 122 of the digital camera 1 receives a signal including an admission code indicative of "non-admission of shooting", the shooting by the shooting portion 14 is not performed even if a shooter executes a shooting operation by using the operation portion 11. Additionally, in FIGS. 13 and 14, in case of "admission of shooting", an image taken by the digital camera 1 may be stored in the image memory 9 as it is. When the shooting management signal received by the receiving portion 112 is indicative of "restricted admission", an image taken by the digital camera 1 may be transmitted to and saved in the managing server 2.

Further, in FIG. 15, an image taken by the digital camera may be stored in the image memory 9 as it is without being encrypted in case of "admission of shooting", and a taken image may be encrypted and stored in the image memory 9 when the shooting management signal received by the receiving portion 112 is indicative of "restricted admission".

Furthermore, in FIG. 14, an image taken by the digital camera 1 may be stored in the managing server 2 without being subjected to image processing even though this image is transmitted to the imaging server 2 in case of the "admission of shooting" and, on the other hand, an image taken by the digital camera 1 may be reduced in size to be not greater than a limit size set by the managing side by reduction processing if the image is larger than the limit size, or the image may be subjected to image processing, e.g., combining a logo set by the managing side and then saved in the server when the shooting management signal received by the receiving portion 112 is indicative of the "restricted admission".

It is to be noted that the shooting admission levels may include levels other than three levels of "admission of shooting", "restricted shooting" and "non-admission of shooting". For example, two levels of "free shooting" and "restricted shooting" alone may be provided, or four or more levels of, e.g., "free shooting", "print restriction", "member print restriction" and "inhibition of shooting" may be provided. Here, the print restriction means that image data cannot be acquired but photographs can be obtained, and the member print restriction means that members only can acquire images as photographs.

A main processing procedure of the digital camera 1 and the managing serer 2 which realizes the above-described operation will now be described with reference to FIGS. 16 to 24. It is to be noted that the following processing corresponds to a main function in processing functions of the digital camera and the managing server. Therefore, the functions which will not be described below but has been described in conjunction with FIGS. 12 to 15 are included in this processing function.

Figure 16:
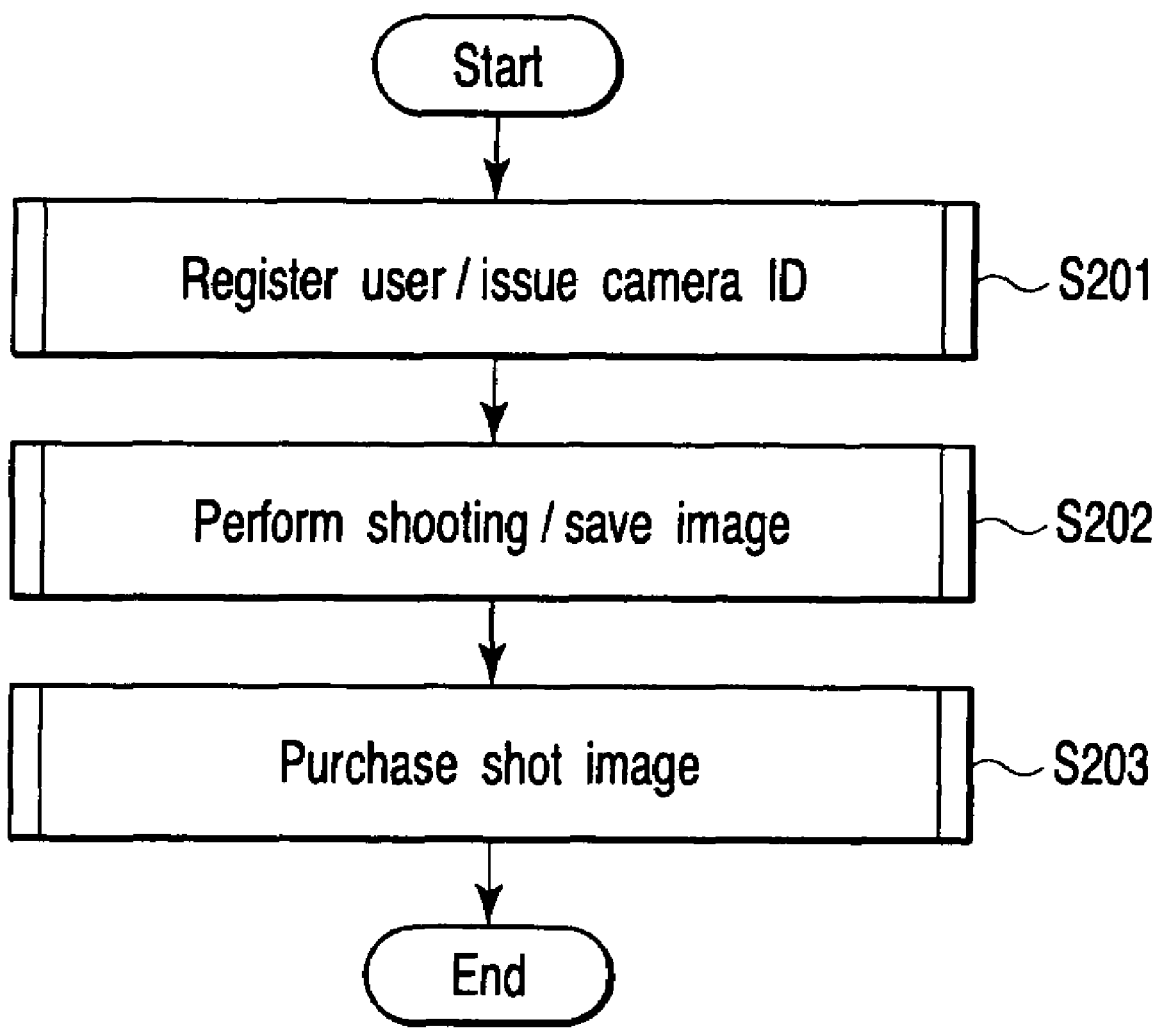
FIG. 16 is a flowchart showing a processing procedure from acceptance of registration of a user to purchase of a shot image.

FIG. 16 is a flowchart showing a processing procedure from acceptance of a user registration and shooting an image to purchase of the shot image.

In a step S201, a user executes user registration/camera ID issue processing (FIG. 17) in order to be registered as a user.

Figure 17:
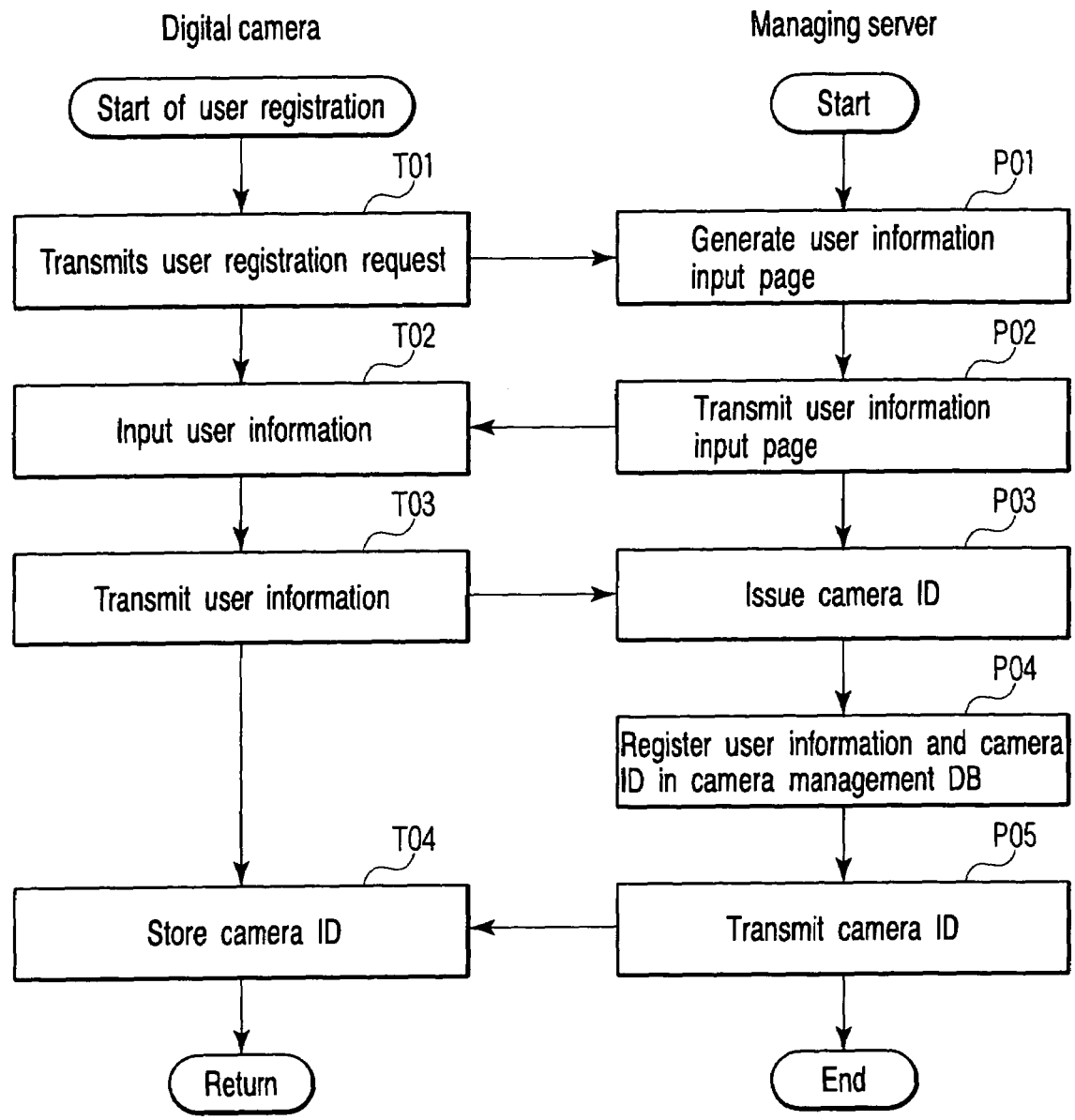
FIG. 17 is a flowchart showing a procedure of user registration/camera ID issue processing.

In a step T01 in FIG. 17, when the user transmits a request informing that he/she wants to be registered as a user to the managing server in the shooting managing system, the managing server 2 creates a user information input page and transmits this page to the digital camera in steps P01 and P02.

In steps T02 and T03, the user inputs necessary information in the user information input page displayed in the display portion 10, and transmits this user information to the managing server 2.

In steps P03 to P05, the controller 17 issues a camera ID which identifies the digital camera 1, and registers this camera ID and the user information in the management DB 21. Then, this camera ID is transmitted to the digital camera 1, the controller 4 saves the camera ID in the camera ID memory 5 in a step T04, and the control returns.

Again referring to FIG. 16, now, the user can perform the shooting by using the digital camera 1. That is, the user can execute shooting/image save processing (FIGS. 18 and 19) depicted in a step S202.

Figure 18:
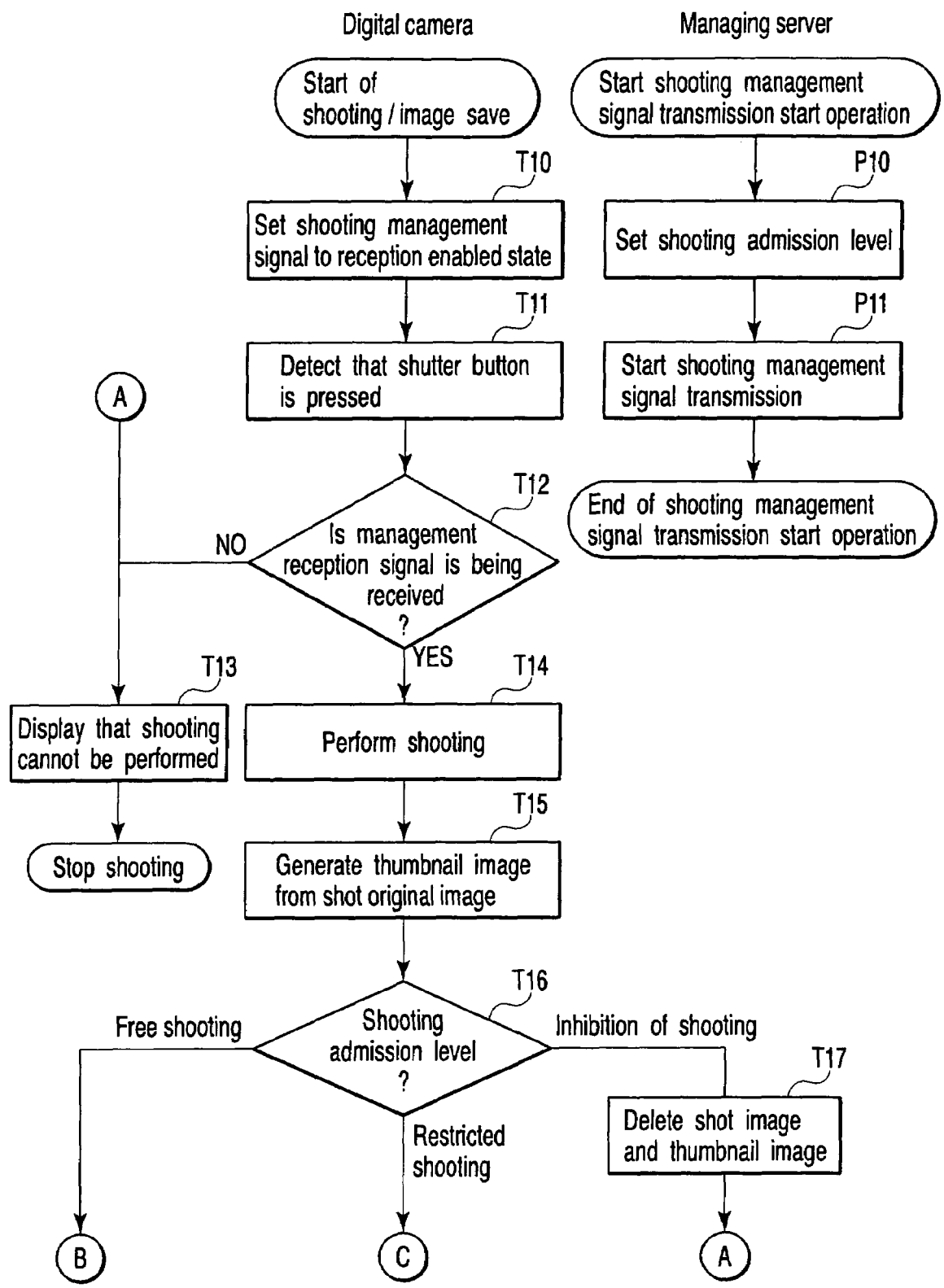
FIG. 18 is a flowchart showing a procedure of shooting/image save processing.

In steps P10 and P11 in FIG. 18, the admission level setting portion 131 of the managing server 2 acquires a shooting admission level input based on the setting operation by an operator on the managing side. Then, transmission of a shooting management signal including a code of the set admission level is started.

In this example, the shooting admission level is classified as follows. (1) Inhibition of shooting: the shooting is inhibited and the shooting cannot be performed at all. (2) Free shooting: the shooting can be freely performed irrespective of presence/absence of user registration. (3) Restricted shooting: a user who has finished the user registration is allowed to perform the shooting under certain restricted conditions. For example, printed images alone can be purchased, a size of an obtainable image is limited, or an image is provided as an image combined with a specific watermark image.

Furthermore, this admission level can be set and changed with an arbitrary timing. Therefore, a manager of the managing server can control the shooting operation of the digital camera 1 by setting the admission level in accordance with a progress of an event.

On the other hand, the user sets the shooting management signal receivable state by operating the digital camera 1 in a step T10. As a result, the admission level judgment portion 113 takes out the admission level from the shooting management signal received by the managing server 2, and outputs this level to the controller 4.

In steps T11 and T12, when it is detected that the shutter button is pressed, the controller 4 checks whether the shooting management signal is in a reception process. If No in the step T12, i.e., if the shooting management signal is not in the reception process, a message informing that the shooting cannot be executed is displayed in the display portion 10 and the shooting is stopped in a step T13.

If Yes in the step T12, i.e., if the shooting management signal is in the reception process, the shooting operation is executed and a thumbnail image is generated from a taken image (an original image) in steps T14 and T15. Furthermore, in a step T16, the shooting admission level is checked.

In the step T16, when the shooting admission level is the shooting inhibition level, the shot image and the thumbnail image are deleted in a step T17, and a message informing that the shooting cannot be performed is displayed in the display portion 10 and the shooting is stopped in the step T13.

Figure 19:
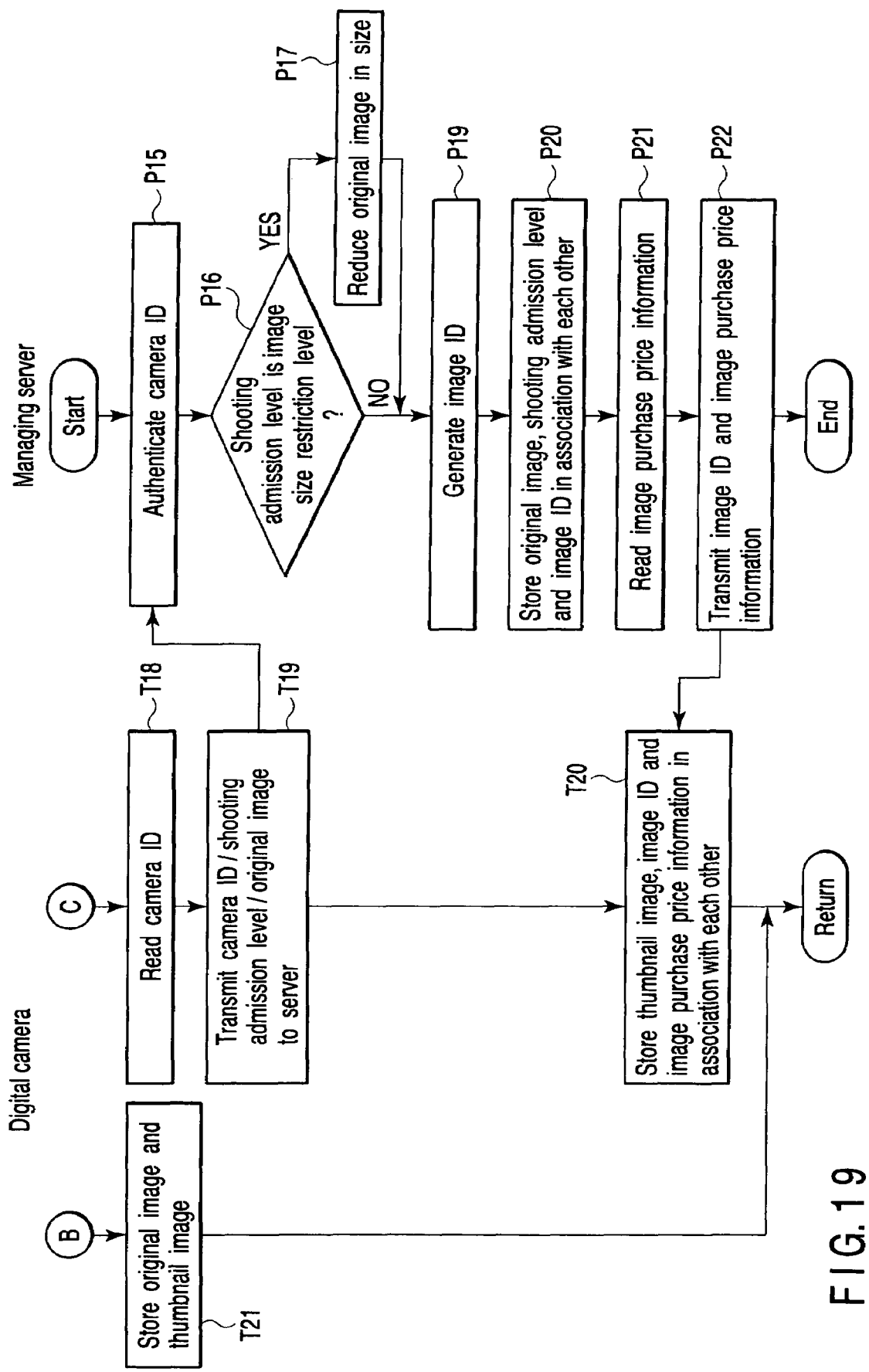
FIG. 19 is a flowchart showing the procedure of shooting/image save processing.

In the step T16, when the shooting admission level is the free shooting level, the original image and the thumbnail image are stored in the image memory in a step T21 in FIG. 19, and the control returns.

In the step T16, when the shooting admission level is the restricted shooting level, the camera ID is read and the camera ID, the shooting admission level and the original image are transmitted to the managing server 2 in steps T18 and T19 in FIG. 19.

In a step P15 in FIG. 19, the controller 17 of the managing server 2 authenticates the transmitted camera ID and checks whether this camera ID is the registered camera ID. Moreover, in steps P16 and P17, if the shooting admission level restricts an image size, the original image is restricted to a predetermined size.

In steps P19 and P20, an image ID which identifies the image is generated, and the original image, the shooting admission level and the image ID are stored in the image information DB 18 in association with each other. Additionally, in steps P21 and P22, image purchase price information and the image ID are transmitted to the digital camera 1.

In the digital camera 1, the thumbnail image, the image ID and the image purchase price information are stored in the image memory 9 in association with each other, and the control returns.

Again referring to FIG. 16, when a user desires to purchase a taken image, shot image purchase processing (FIG. 20) in a step S203 is executed.

Figure 20:
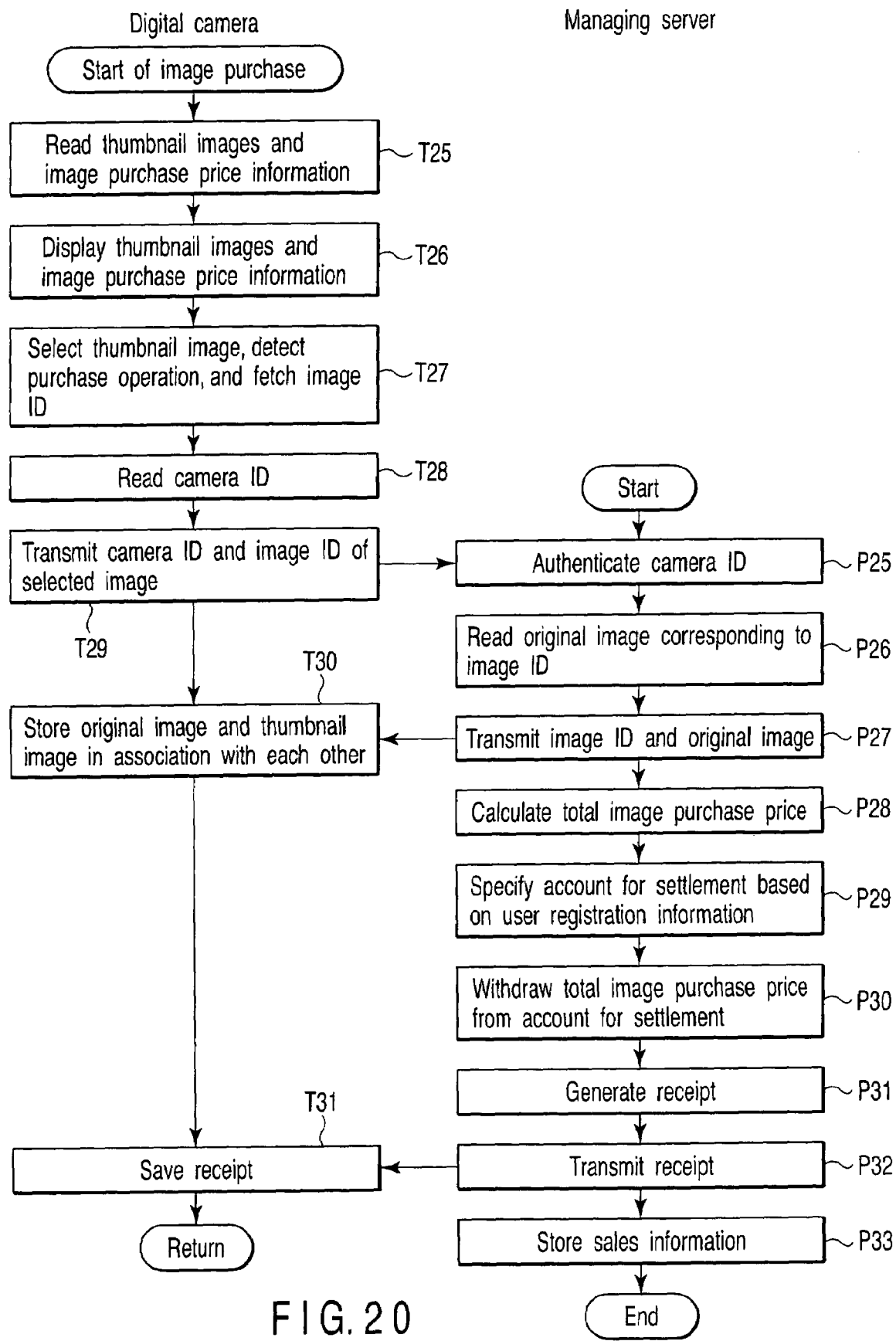
FIG. 20 is a flowchart showing a procedure of shot image purchase processing.

In steps T25 and T26 in FIG. 20, the controller 4 reads the thumbnail image and the image purchase price information, and displays them in the display portion 10. In steps T27 to T29, when the user specifies a thumbnail image and operates purchase, the controller 4 reads the camera ID and transmits the camera ID and the image ID of the selected image to the managing server 2.

The controller 17 of the managing server 2 authenticates the camera ID, and checks whether this camera ID is the registered camera ID in a step P25. Further, in steps P26 and P27, an original image corresponding to the image ID is read, and the image ID and the original image are transmitted to the digital camera 1. The digital camera 1 stores the transmitted original image and the thumbnail image in the image memory 9 in association with each other. The user can obtain the original image by this processing procedure.

On the other hand, in the managing server 2, accounting processing is executed. That is, in steps P28 to P30, a total image purchase price is calculated, and this amount is withdrawn from an account for settlement of the user. Then, in steps P31 to P33, a receipt is created and transmitted to the digital camera 1, and sales information is stored in the management DB 21.

The digital camera 1 receives and saves the transmitted receipt in a step T31, and the control returns.

A description will now be given as to a processing procedure of ordering printing (FIG. 21) in place of the shot image purchase processing depicted in the step S203 in FIG. 16.

Figure 21:
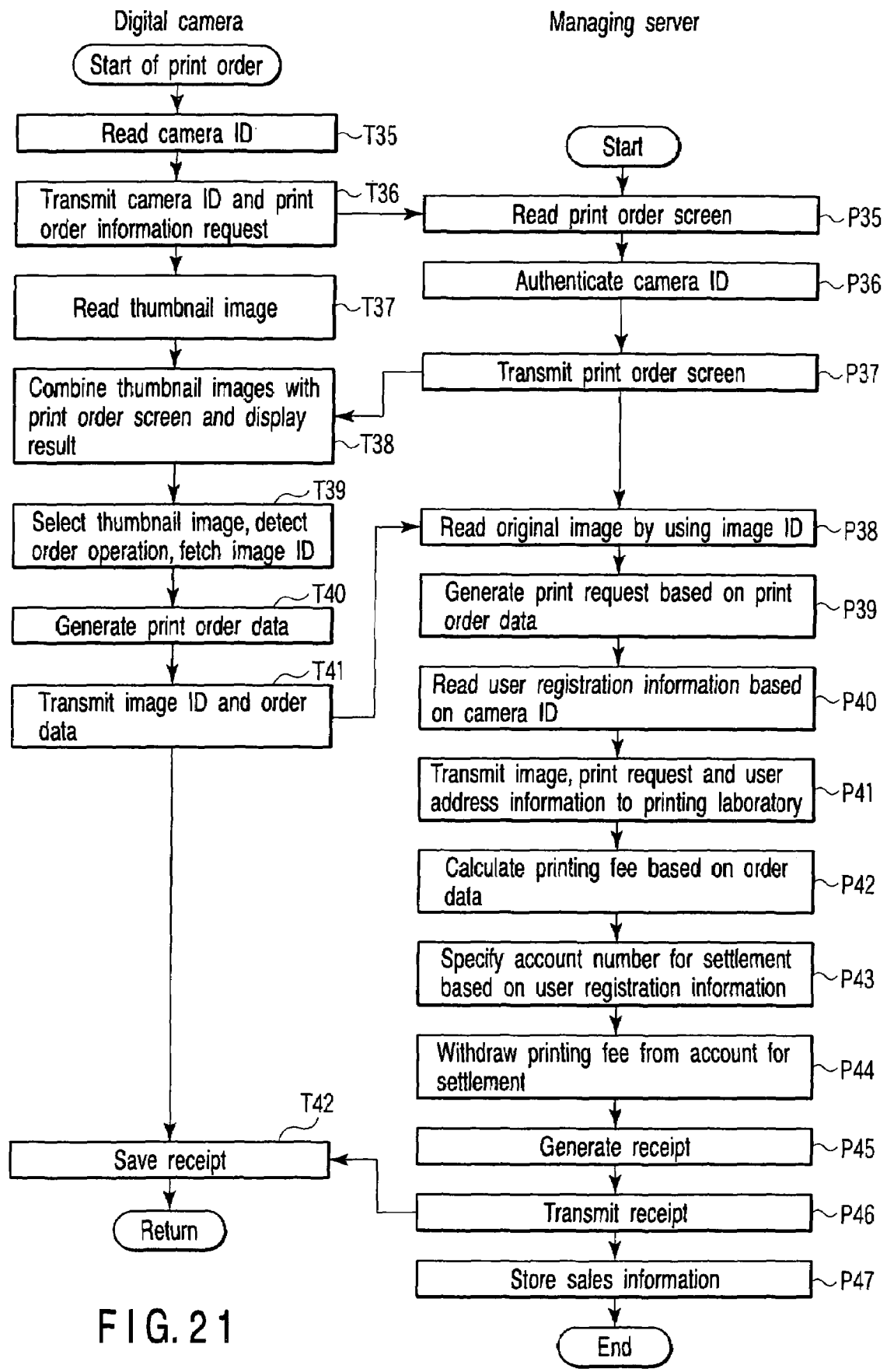
FIG. 21 is a flowchart showing a processing procedure of ordering printing.

In steps T35 and T36 in FIG. 21, the controller 4 of the digital camera 1 reads a camera ID from the camera ID memory 5, and transmits a print order information request together with this camera ID to the managing server 2.

In steps P35 to P37, the controller 17 of the managing server 2 authenticates the camera ID, and checks whether this camera ID is the registered camera ID. Then, a print order screen is read, and this screen is transmitted to the digital camera 1.

In the digital camera 1, in steps T37 and T38, thumbnail images are read, and these images are combined with the transmitted print order screen and displayed in the display portion 10. In steps T39 to T41, when the user specifies a thumbnail image and operates the print order, the controller 4 generates print order data, and transmits this data together with an image ID of the selected image to the managing server 2.

In the managing server 2, in steps P38 to P41, an original image corresponding to the image ID is read, a print request is generated from the print order data, and user registration information is read based on the camera ID. Then, the original image, the print request and the user's address information are transmitted to the printing laboratory.

Subsequently, in the managing server 2, the accounting processing is executed. That is, in steps P42 to P44, a printing fee is calculated, and this amount is withdrawn from an account for settlement of the user. Further, in steps P45 to P47, a receipt is created and transmitted to the digital camera 1, and sales information is stored in the management DB 21.

The digital camera 1 receives and saves the transmitted receipt in a step T42, and the control returns.

A description will now be given as to a processing procedure of encrypting a shot image and saving this image in the digital camera 1 (FIGS. 22A, 22B and 23) and a processing procedure of decrypting an encrypted image (FIG. 24) in place of the shot image save processing by the server indicated in the step S202 in FIG. 16.

Figures 22A, 22B:
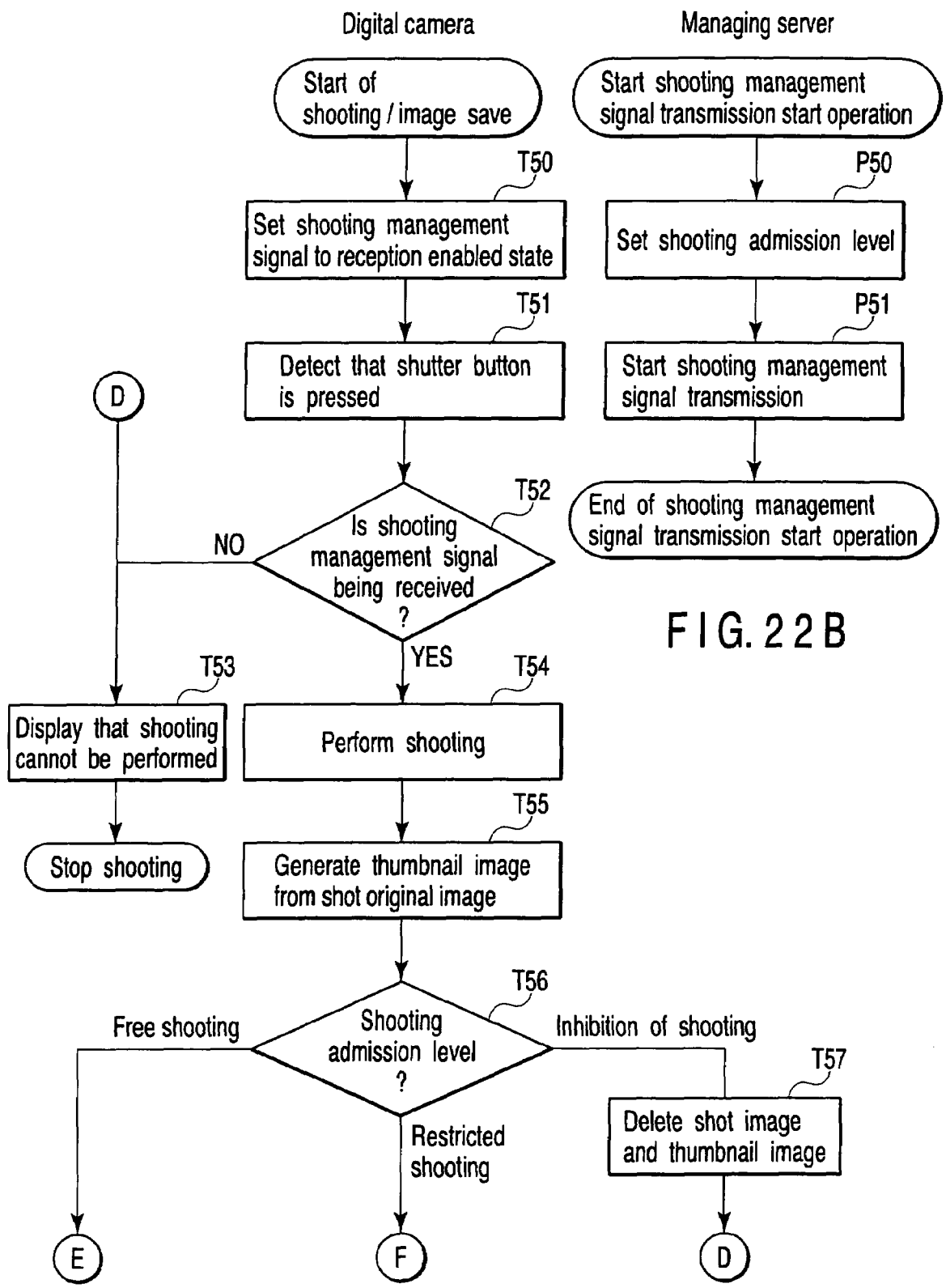
FIG. 22A is a flowchart showing a processing procedure of encrypting a shot image and saving this image in a digital camera.
FIG. 22B is a flowchart showing the processing procedure of encrypting a shot image and saving this image in a digital camera.

In steps P50 and P51 in FIG. 22B, the admission level setting portion 131 of the managing server 2 acquires a shooting admission level input based on a setting operation by an operator on the managing side. Then, transmission of a shooting management signal including a code of the set admission level is started.

In this example, the shooting admission level is classified as follows. (1) Inhibition of shooting: the shooting is inhibited and cannot be performed at all. (2) Free shooting: the shooting can be freely performed irrespective of presence/absence of user registration. (3) Restricted shooting: a user who has finished user registration is allowed to perform the shooting under certain restricted conditions. For example, a printable image size is restricted, or an image is provided as an image combined with a specific watermark image.

Moreover, this admission level can be set and changed with an arbitrary timing. Therefore, a manager of the managing server can control the shooting operation of the digital camera 1 by setting the admission level in accordance with a progress of an event.

On the other hand, a user sets a shooting management signal receivable state by operating the digital camera 1 in a step T50 in FIG. 22A. As a result, the admission level judgment portion 113 takes out the admission level from the shooting management signal received by the managing server 2, and outputs this level to the controller 4.

In steps T51 and T52, when it is detected that the shutter button is pressed, the controller 4 checks whether the shooting management signal is in a reception process. If No in the step T52, i.e., if the shooting management signal is not in the reception process, a message informing that the shooting cannot be performed is displayed in the display portion 10 and the shooting is stopped in a step T53.

If Yes in the step T52, i.e., if the shooting management signal is in the reception process, the shooting operation is executed and a thumbnail image is generated from a taken image (an original image) in steps T54 and T55. Furthermore, in a step T56, a shooting admission level is checked.

If the shooting admission level is the shooting inhibition level in the step T56, the shot image and the thumbnail image are deleted in a step T57, and a message informing that the shooting cannot be performed is displayed in the display portion 10 and the shooting is stopped in a step T53.

Figure 23:
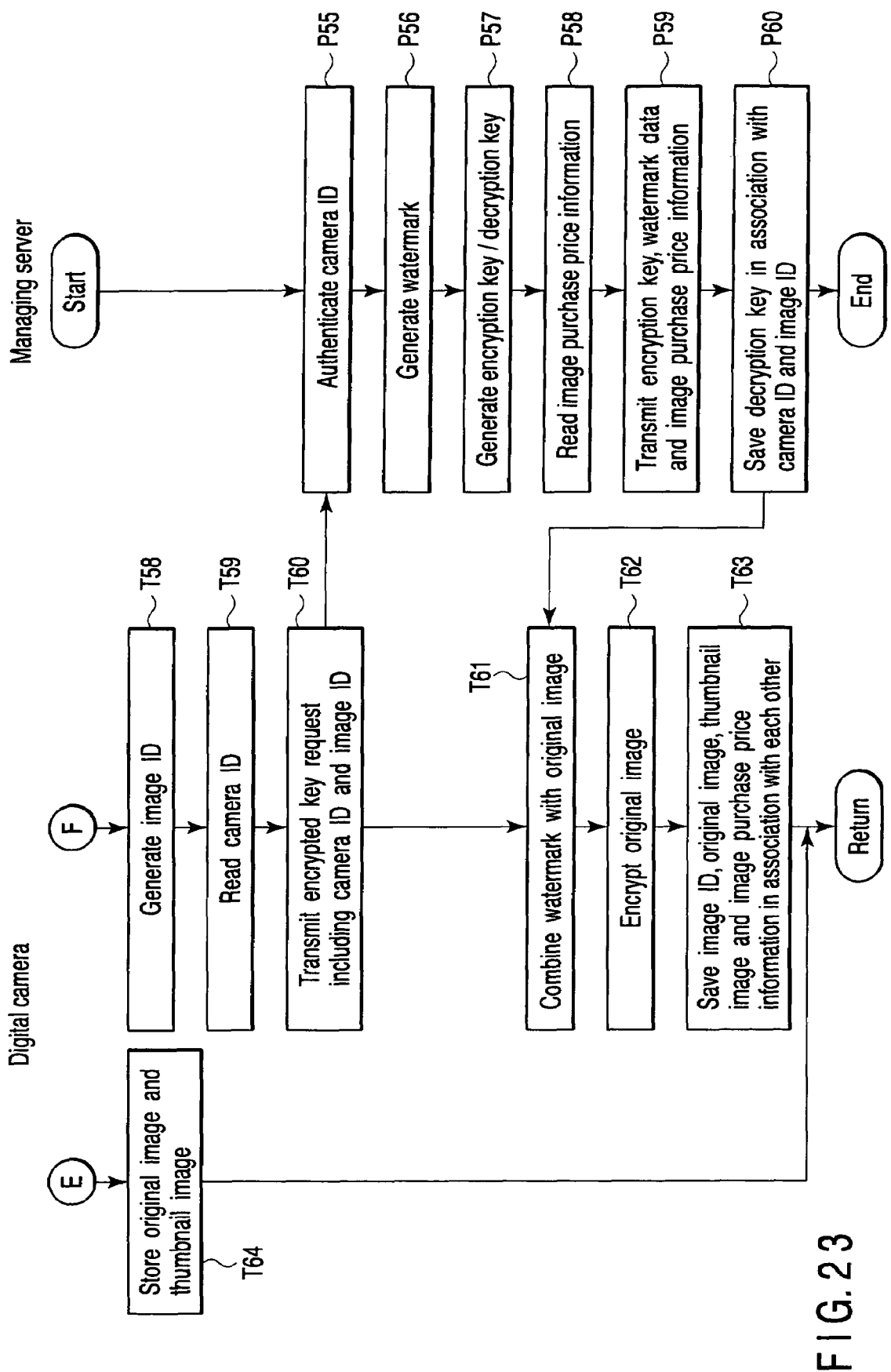
FIG. 23 is a flowchart showing a processing procedure of encrypting a shot image and saving this image in a digital camera.

If the shooting admission level is the free shooting level in the step T56, the original image and the thumbnail image are stored in the image memory in a step T64 in FIG. 23, and the control returns.

If the shooting admission level is the restricted shooting level in the step T56, an image ID which identifies the original image is generated, a camera ID is read, and this camera ID and the image ID as well as an encryption key request are transmitted to the managing server 2 in steps T58 to T60 in FIG. 23.

In a step P55 in FIG. 23, the controller 17 of the managing server 2 authenticates the camera ID and checks whether this camera ID is a registered camera ID. Further, in steps P56 and P57, watermark data is generated, and an encryption key and a decryption key are also generated. Subsequently, in steps P58 to P60, image purchase price information is read, and the encryption key, the watermark data and the image purchase price information are transmitted to the digital camera 1. Then, the decryption key is saved in association with the camera ID and the image ID.

In the digital camera 1, in steps T61 to T63, the transmitted watermark data is combined with the original image, and the combined image is encrypted by using the encryption key. Furthermore, the image ID, the encrypted original image, the thumbnail image and the image purchase price information are saved in association with each other, and the control returns.

Thereafter, when a user desires to purchase a shot image, processing of decrypting an encrypted image (FIG. 24) is executed.

Figure 24:
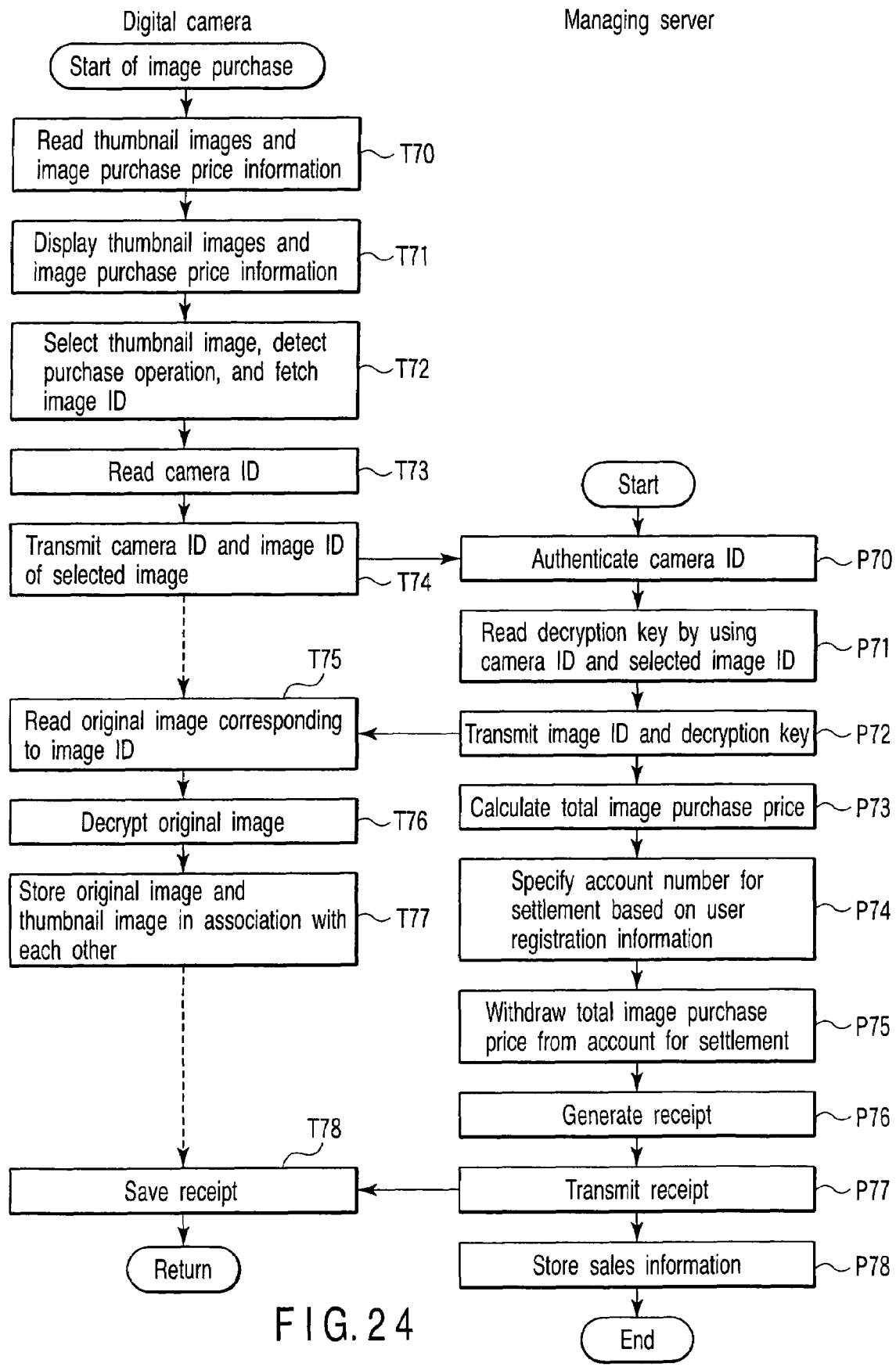
FIG. 24 is a flowchart showing a processing procedure of decrypting an encrypted image.

In steps T70 and T71 in FIG. 24, the controller 4 reads thumbnail images and an image purchase price information, and displays such information in the display portion 10. In steps T72 to T74, when the user selects a thumbnail image, a camera ID is read from the camera ID memory 11, and this camera ID and an image ID of the selected image are transmitted to the managing server 2.

The controller 17 of the managing server 2 authenticates the camera ID and checks whether this camera ID is a registered camera ID in a step P70. Moreover, in steps P71 and P72, a decryption key is read based on the transmitted camera ID and an image ID of the selected image, and this decryption key and the image ID are transmitted to the digital camera 1.

In steps T75 to T77, the controller 4 of the digital camera 1 reads an encrypted original image corresponding to the image ID, and decrypts the original image by using the decryption key. Additionally, the decrypted original image and the thumbnail image are stored in the image memory in association with each other.

On the other hand, in the managing server 2, accounting processing is executed. That is, in steps P73 to P75, a total image purchase price is calculated, and this amount is withdrawn from an account for settlement of the user. Further, in steps P76 to P78, a receipt is created and transmitted to the digital camera 1, and sales information is stored in the management DB 21.

In the step T78, the digital camera 1 receives and saves the transmitted receipt, and the control returns.

It is to be noted that, in the shooting managing system according to each embodiment mentioned above, the digital camera 1 can be applied to a mobile phone, a PDA (Personal Digital Assistance) or the like in order to constitute a mobile phone with a camera function, a PDA with a camera function.

It is to be noted that each function described in the foregoing embodiments may be constituted by using hardware or may be realized by reading a program having each function to a computer by using software. Furthermore, each function may be constituted by appropriately selecting either software or hardware.

Moreover, each function may be likewise realized by reading a program stored in a non-illustrated storage medium to a computer. Here, the storage medium in this embodiment may take any recording format as long as this medium is a storage medium in which a program can be recorded and read by a computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A shooting apparatus comprising:
 a shooting portion which shoots a subject to generate an original image;
 an index image generating portion which generates an index image from the original image;
 an image memory which stores at least an image;
 a communicating portion which performs transmission/reception of information with a managing server which manages images by radio;
 an original image specifying information generation portion which generates original image specifying information which specifies the original image;
 an encryption key request transmitting portion which transmits an encryption key request including the original image specifying information to the managing server through the communicating portion;
 an encryption key receiving portion which receives an encryption key from the management server through the communicating portion;
 an encryption portion which encrypts the original image by using the received encryption key;
 an encrypted image storage portion which stores the original image specifying information, the encrypted original image and the index image of the original image in the image memory in association with each other;
 a display which displays the plurality of index images stored in the image memory;
 a selecting portion which selects at least one index image from the plurality of index images displayed in the display;
 an extraction portion which extracts the original image specifying information corresponding to the index image selected by the selecting portion from the image memory;
 a decryption key request transmitting portion which transmits a decryption key request including the original image specifying information to the managing server through the communicating portion;
 a decryption key receiving portion which receives a decryption key transmitted from the managing server in accordance with the original image specifying information through the communicating portion;
 a decryption portion which decrypts the encrypted original image specified by the original image specifying information by using the received decryption key; and
 an original image storage portion which stores the original image decrypted by the decryption portion in the image memory.

2. A managing server which manages images shot by shooting apparatuses, the managing server comprising:
 an information communicating portion which performs transmission/reception of information with each shooting apparatus;
 an information memory which stores the information received through the information communicating portion;
 an encryption key request receiving portion which receives an encryption key request including image specifying information which specifies an image in the shooting apparatus from the shooting apparatus through the information communicating portion;
 an encryption key generation portion which generates an encryption key and a decryption key in accordance with the encryption key request;
 an encryption key transmitting portion which transmits the encryption key generated by the encryption key generation portion to the shooting apparatus through the communicating portion;
 a decryption key storage portion which stores the image specifying information included in the encryption key request and the decryption key generated by the encryption key generation portion in the information memory in association with each other;
 a decryption key request receiving portion which receives a decryption key request including the image specifying information from the shooting apparatus through the communicating portion;
 a decryption key read portion which reads the decryption key from the information memory in accordance with the image specifying information included in the decryption key request; and a decryption key transmitting portion which transmits the decryption key read by the decryption key read portion to the shooting apparatus through the communicating portion.

3. The shooting apparatus according to claim 2, further comprising:

a shooting admission level setting portion which sets a level of restricting a shooting operation of the shooting apparatuses;

a shooting management signal generation portion which generates a shooting management signal which includes a shooting admission level set by the shooting admission level setting portion as shooting admission level information; and a shooting management signal transmitting portion which transmits the shooting management signal.

4. A shooting managing system comprising: shooting apparatuses; and a managing server which manages images shot by the shooting apparatuses, each shooting apparatus having:

a shooting portion which shoots a subject to generate an original image;

an index image generating portion which generates an index image from the image;

an image memory which stores images;

an image specifying information generation portion which generates image specifying information which specifies the image shot by the shooting portion;

a first communicating portion which performs transmission/reception of information with the managing server by radio;

an encryption key request transmitting portion which transmits an encryption key request including the image specifying information to the managing server through the first communicating portion;

an encryption key receiving portion which receives an encryption key requested through the first communicating portion from the managing server;

an encryption portion which encrypts the image by using the received encryption key; and an encrypted image storage portion which stores the encrypted image in the image memory in association with the image specifying information;

a display which displays the plurality of index images stored in the image memory;

a selecting portion which selects at least one index image from the plurality of index images displayed in the display;

a decryption key request transmitting portion which transmits a decryption key request signal including image specifying information of an image corresponding to the index image selected by the selecting portion to the managing server through the first communicating portion;

a decryption key receiving portion which receives the decryption key transmitted from the managing server in accordance with the original image specifying information through the first communicating portion;

a decryption portion which decrypts the encrypted image specified by the image specifying information by using the received decryption key; and an image storage portion which stores the decrypted image in the image memory, the managing server having:

a second communicating portion which performs transmission/reception of information with the shooting apparatus;

an information memory which stores the information received through the second communication portion;

an encryption key generation portion which generates an encryption key and a decryption key;

an encryption key request receiving portion which receives the encryption key request through the second communicating portion;

an encryption key generation portion which generates an encryption key and a decryption key in accordance with the encryption key request;

an encryption key transmitting portion which transmits the generated encryption key to the shooting apparatus through the second communicating portion;

a decryption key storage portion which stores the image specifying information included in the encryption key request and the decryption key generated by the encryption key generation portion in the information memory in association with each other;

a decryption key request receiving portion which receives a decryption key request including the image specifying information from the shooting apparatus through the second communicating portion;

a decryption key read portion which reads the decryption key from the information memory in accordance with the image specifying information included in the decryption key request; and a decryption key transmitting portion which transmits the decryption key read by the decryption key read portion to the shooting apparatus through the second communicating portion.

5. The shooting managing system according to claim 4, wherein the managing server has:

a shooting admission level setting portion which sets a level of restricting a shooting operation of the shooting apparatuses;

a shooting management signal generation portion which generates a shooting management signal which includes a shooting admission level set by the shooting admission level setting portion as shooting admission level information; and a shooting management signal transmitting portion which transmits the shooting management signal, and the shooting apparatus further has:

an image storage control portion which determines either storing an image encrypted by the encryption portion in the image memory by using the encrypted image storage portion or storing the image in the image memory as it is depending on the shooting admission level information included in the shooting management signal.

6. The shooting managing system according to claim 5, wherein the image storage control portion controls the shooting portion to be prevented from performing shooting when the shooting management signal receiving portion is not receiving the shooting management signal or when the received shooting admission level information represents inhibition of shooting.

7. The shooting managing system according to claim 5, wherein the image storage control portion controls an image shot by the shooting portion to be prevented from being stored in the image memory when the shooting management signal receiving portion is not receiving the shooting management signal or when the received shooting admission level information represents inhibition of shooting.

8. The shooting managing system according to claim 5, wherein the image storage control portion encrypts an image shot by the shooting portion by using the encryption portion and stores the encrypted image in the image memory when the received shooting admission level information represents restriction of shooting.

9. An image managing method in a system comprising shooting apparatuses and a managing server,
- each shooting apparatus having: a shooting portion which shoots a subject to generate an image; an image memory which stores at least the image; and a first information communicating portion which performs transmission/reception of information by radio,
- the managing server having: a second information communicating portion which performs transmission/reception of information with each shooting apparatus by radio; and an information memory which stores information,
- wherein the shooting apparatus performs:
- shooting a subject by using the shooting portion;
- generating an index image of the shot image and image specifying information which specifies the image; and
- transmitting the generated image specifying information to the managing server through the first information communicating portion,
- the managing server performs:
- receiving the image specifying information from the shooting apparatus through the second information communicating portion;
- generating an encryption key and decryption key;
- storing the generated decryption key and the received image specifying information in the information memory in association with each other;
- transmitting the encryption key to the shooting apparatus through the second communicating portion, and
- the shooting apparatus performs:
- receiving the encryption key from the managing server through the first communicating portion;
- encrypting the image by using the received encryption key;
- storing the encrypted image and the image specifying information in the image memory in association with each other;
- displaying the plurality of index images stored in the image memory in a display;
- selecting at least one index image from the plurality of index images displayed in the display; and
- transmitting a decryption key request signal including image specifying information of an image corresponding to the selected index image through the first information communicating portion,
- the managing server further performs:
- receiving the decryption key request signal transmitted from the shooting apparatus through the second information communicating portion;
- reading a decryption key specified by the image specifying information included in the received image request signal from the information memory; and
- transmitting the decryption key read from the information memory to the shooting apparatus through the second information communicating portion, and
- the shooting apparatus further performs:
- receiving the decryption key transmitted by the managing server through the first information communicating portion;
- decrypting the image by using the received decryption key; and
- storing the decrypted image in the image memory.

10. The image managing method according to claim 9, wherein the managing server performs:
- setting a level of restricting a shooting operation of the shooting apparatuses as a shooting admission level;
- generating a shooting management signal including the set shooting admission level; and
- transmitting the shooting management signal, and
- the shooting apparatus performs:
- receiving the shooting management signal transmitted from the managing server; arid
- determining either storing the encrypted image in the image memory or storing the image in the image memory as it is depending on the shooting admission level included in the shooting management signal.

11. The image managing method according to claim 10, wherein the shooting apparatus controls shooting to be prevented when the shooting management signal is not being received or when the received shooting admission level information represents inhibition of shooting.

12. The image managing method according to claim 10, wherein the shooting apparatus controls a shot image to be prevented from being stored in the image memory when the shooting management signal is not being received or when the received shooting admission level information represents inhibition of shooting.

13. The image managing method according to claim 10, wherein the shooting apparatus encrypts a shot image and stores the encrypted image in the image memory when the received shooting admission level information restricts shooting.

* * * * *